United States Patent
Salyers et al.

(10) Patent No.: US 9,736,706 B2
(45) Date of Patent: Aug. 15, 2017

(54) MANAGED ACCESS SYSTEM WITH MONITORING DEVICE TO DETERMINE SYSTEM OPERABILITY

(71) Applicant: HARRIS CORPORATION, Melbourne, FL (US)

(72) Inventors: Eric J. Salyers, Grant, FL (US); Shawn H. Gallagher, Melbourne, FL (US); Steven D. Halford, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 26 days.

(21) Appl. No.: 14/865,355

(22) Filed: Sep. 25, 2015

(65) Prior Publication Data

US 2017/0094534 A1  Mar. 30, 2017

(51) Int. Cl.
*H04W 24/02* (2009.01)
*H04W 12/06* (2009.01)
*H04W 12/08* (2009.01)
*H04W 4/02* (2009.01)
*H04W 84/04* (2009.01)

(52) U.S. Cl.
CPC ........... *H04W 24/02* (2013.01); *H04W 4/021* (2013.01); *H04W 12/06* (2013.01); *H04W 12/08* (2013.01); *H04W 84/045* (2013.01)

(58) Field of Classification Search
CPC ..... H04W 24/02; H04W 4/021; H04W 12/06; H04W 12/08; H04W 84/045
See application file for complete search history.

(56) References Cited

U.S. PATENT DOCUMENTS 3,983,492 A  9/1976  Fisher et al.
4,527,281 A  7/1985  Imagawa et al.
(Continued)

FOREIGN PATENT DOCUMENTS

EP  1 051 053  11/2000
WO  03/019907  3/2003
(Continued)

OTHER PUBLICATIONS

Salyers et al., U.S. Appl. No. 15/153,770, filed May 13, 2016.
(Continued)

*Primary Examiner* — Kashif Siddiqui
(74) *Attorney, Agent, or Firm* — Allen, Dyer, Doppelt, Gilchrist, P.A.

(57) ABSTRACT

A managed access system for mobile wireless devices (MWDs) in a facility that is geographically within a wireless communications network includes a plurality of antennas arranged at the facility and at least one MWD monitoring device. Radio equipment is coupled to the antennas. A management access controller cooperates with the radio equipment to communicate with a given MWD within the facility, block outside communications via the wireless communications network when the given MWD is an unauthorized MWD, and provide outside communications when the given MWD is an authorized MWD. The management access controller cooperates with at least one MWD monitoring device to determine whether the radio equipment and at least one MWD monitoring device both detect the given MWD.

34 Claims, 33 Drawing Sheets

(56) References Cited

U.S. PATENT DOCUMENTS

| | | | |
|---|---|---|---|
| 4,652,816 | A | 3/1987 | Crookshanks |
| 5,500,648 | A | 3/1996 | Maine et al. |
| 5,796,366 | A | 8/1998 | Grebnev et al. |
| 5,835,907 | A | 11/1998 | Newman |
| 5,870,029 | A | 2/1999 | Otto et al. |
| 5,977,913 | A | 11/1999 | Christ |
| 6,144,318 | A | 11/2000 | Hayashi et al. |
| 6,157,823 | A | 12/2000 | Fougnies et al. |
| 6,202,026 | B1 | 3/2001 | Nimura et al. |
| 6,288,640 | B1 | 9/2001 | Gagnon |
| D478,517 | S | 8/2003 | Law |
| 6,720,921 | B2 | 4/2004 | Ripingill, Jr. et al. |
| 6,754,502 | B2 | 6/2004 | Hildebrand et al. |
| 6,832,093 | B1 | 12/2004 | Ranta |
| 6,845,240 | B2 | 1/2005 | Carlson et al. |
| 6,853,687 | B2 | 2/2005 | Harrington et al. |
| 6,912,230 | B1 | 6/2005 | Salkini et al. |
| 6,912,388 | B2 | 6/2005 | Yang |
| 6,970,183 | B1 | 11/2005 | Monroe |
| 7,061,220 | B1 | 6/2006 | Nalbandian et al. |
| 7,110,779 | B2 | 9/2006 | Billhartz et al. |
| 7,132,961 | B2 | 11/2006 | Yannone et al. |
| 7,187,326 | B2 | 3/2007 | Beadle et al. |
| 7,218,090 | B1 | 5/2007 | Nalbandian et al. |
| 7,259,694 | B2 | 8/2007 | Myllymaki et al. |
| 7,321,777 | B2 | 1/2008 | Billhartz et al. |
| 7,340,260 | B2 | 3/2008 | McAlexander |
| 7,426,231 | B1 * | 9/2008 | Dorfman ................ H01Q 21/24 375/130 |
| 7,578,448 | B2 | 8/2009 | Beenau et al. |
| 7,592,956 | B2 | 9/2009 | McPherson et al. |
| 7,616,155 | B2 | 11/2009 | Bull et al. |
| 7,657,265 | B2 | 2/2010 | McAlexander |
| 7,733,901 | B2 | 6/2010 | Salkini et al. |
| 7,778,651 | B2 | 8/2010 | Billhartz |
| 7,804,448 | B2 | 9/2010 | Bull et al. |
| 7,864,047 | B2 | 1/2011 | Aninye et al. |
| 7,911,385 | B2 | 3/2011 | Heuser |
| 7,941,853 | B2 | 5/2011 | Rozenberg et al. |
| 8,072,311 | B2 | 12/2011 | Sadr et al. |
| 8,078,190 | B2 | 12/2011 | Noonan et al. |
| 8,171,554 | B2 | 5/2012 | Elovici et al. |
| 8,213,957 | B2 | 7/2012 | Bull et al. |
| 8,224,233 | B2 | 7/2012 | Brisebois et al. |
| 8,233,880 | B2 | 7/2012 | Johnson |
| 8,238,936 | B2 | 8/2012 | Nadler et al. |
| 8,254,886 | B2 | 8/2012 | Salkini et al. |
| 8,346,281 | B2 | 1/2013 | Noonan et al. |
| 8,350,675 | B2 | 1/2013 | Riechel |
| 8,350,758 | B1 | 1/2013 | Parvizi et al. |
| 8,437,741 | B2 | 5/2013 | Salkini et al. |
| 8,461,973 | B2 | 6/2013 | Reed et al. |
| 8,472,968 | B1 | 6/2013 | Kim |
| 8,509,740 | B2 | 8/2013 | Salkini et al. |
| 8,606,229 | B2 | 12/2013 | Johnson |
| 8,624,727 | B2 | 1/2014 | Saigh et al. |
| 8,626,195 | B2 | 1/2014 | Noonan et al. |
| 8,629,762 | B2 | 1/2014 | Sadr et al. |
| 8,711,033 | B2 | 4/2014 | Calmettes et al. |
| 8,750,903 | B1 | 6/2014 | Fitzsimmons et al. |
| 8,767,923 | B1 | 7/2014 | Edwards |
| 8,825,011 | B2 | 9/2014 | Salkini et al. |
| 8,838,812 | B2 | 9/2014 | Miller et al. |
| 8,843,155 | B2 | 9/2014 | Burton et al. |
| 8,866,607 | B2 | 10/2014 | Velusamy |
| 8,878,725 | B2 | 11/2014 | Lu |
| 8,893,224 | B2 | 11/2014 | Horvitz et al. |
| 8,897,694 | B2 | 11/2014 | Brisebois et al. |
| 8,923,824 | B1 | 12/2014 | Materman |
| 8,929,206 | B2 | 1/2015 | Markwart et al. |
| 8,983,446 | B2 | 3/2015 | Nadler et al. |
| 9,237,422 | B1 * | 1/2016 | Bhat ................ H04W 4/021 |
| 2001/0036821 | A1 | 11/2001 | Gainsboro et al. |
| 2004/0121787 | A1 | 6/2004 | Day et al. |
| 2004/0153553 | A1 | 8/2004 | Chotkowski et al. |
| 2006/0046746 | A1 | 3/2006 | Ranford et al. |
| 2008/0032666 | A1 | 2/2008 | Hughes et al. |
| 2008/0032705 | A1 * | 2/2008 | Patel ................ H04W 4/18 455/456.1 |
| 2008/0039089 | A1 * | 2/2008 | Berkman ................ H04W 36/04 455/436 |
| 2008/0043993 | A1 | 2/2008 | Johnson |
| 2008/0057976 | A1 | 3/2008 | Rae et al. |
| 2008/0201158 | A1 | 8/2008 | Johnson et al. |
| 2010/0079594 | A1 | 4/2010 | Voglewede et al. |
| 2010/0159879 | A1 | 6/2010 | Salkini et al. |
| 2010/0197324 | A1 | 8/2010 | Bolin et al. |
| 2010/0304712 | A1 | 12/2010 | Sweeney et al. |
| 2011/0045815 | A1 | 2/2011 | Schork et al. |
| 2011/0059688 | A1 | 3/2011 | Noonan et al. |
| 2012/0147834 | A1 | 6/2012 | Zisimopoulos et al. |
| 2013/0316638 | A1 | 11/2013 | Jang et al. |
| 2013/0316738 | A1 | 11/2013 | Noonan |
| 2014/0018059 | A1 | 1/2014 | Noonan et al. |
| 2014/0194084 | A1 | 7/2014 | Noonan et al. |
| 2014/0199963 | A1 | 7/2014 | Mohebbi |
| 2015/0312766 | A1 * | 10/2015 | Teeni ................ H04W 4/043 455/411 |

FOREIGN PATENT DOCUMENTS

| | | |
|---|---|---|
| WO | 2008/097506 | 8/2008 |
| WO | 2014/151249 | 9/2014 |

OTHER PUBLICATIONS

Salyers et al., U.S. Appl. No. 15/153,786, filed May 13, 2016.

Souppaya et al. "Guidelines for Managing the Security of Mobile Devices in the Enterprise—recommendations of the National Institute of Standards and Technology" Jun. 2013; NIST Special Publication 800-124 Revision 1; http://csrc.nist.gov/. pp. 20.

MMI Research Limited V. (1) Cellxion Limited et al. Neutral Citation No. [2009] EWHC 418 (Pat): Nov. 3, 2009; pp. 29.

"Operational Security Standard: Management of Information Technology Security (MITS)" http://www.tbs-sct.gc.ca/pol/doc-eng.aspx?id=12328&section=HTML; retrieved from internet Jun. 7, 2016; pp. 23.

Bisson et al. "Methods for Prevention of the Use of Mobile Phones in Correctional Institutions" 2012 IEEE International Carnahan Conference on Security Technology (ICCST), pp. 237-245. E-ISBN : 978-1-4673-2449-6. Date of Conference: Oct. 15-18, 2012.

Chen et al "Spectrum Occupancy Analysis Based on Radio Monitoring Network" 2012 1st IEEE International Conference on Communications in China (ICCC), pp. 739-744. E-ISBN : 978-1-4673-2813-5 Date of Conference: Aug. 15-17, 2012.

Divya et al. "Design of User Specific Intelligent Cell Phone Jammer" 2012 1st International Conference on Recent Advances in Information Technology (RAIT), pp. 312-316; Print ISBN: 978-1-4577-0694-3; Date of Conference: Mar. 15-17, 2012.

Gurr et al. "Wide-Band Radio Frequency (RF) Source Surveillance" International telemetering conference; 34th, ITC/USA '98; 1998; San Diego; CA: pp. 316 323; ISBN: 556716732.

Roxin et al. "Survey of Wireless Geolocation Techniques"IEEE Globecom Workshops, Nov. 2007, Washington, DC, United States. pp. 9 Pages, 2007, •DOI: 10.1109/GLOCOMW.2007.4437809.

Shah et al. "Cell Phone Jammer" INMIC 2008. IEEE International Multitopic Conference, 2008; pp. 579-580; E-ISBN : 978-1-4244-2824-3; Date of Conference: Dec. 23-24, 2008.

Wang et al. "An Agile Radio Framework for Unmanaged Wireless Environments" MobiHoc '09 Proceedings of the tenth ACM international symposium on Mobile ad hoc networking and computing: pp. 333-334; ISBN: 978-1-60558-624-3. May 18, 2009.

Wu et al. "Design of a Network Receiver for 20MHZ to 3GHZ Ultra-Short Wave Spectrum Monitoring" System Science, 2012 3rd International Conference on Engineering Design and Manufacturing Informatization (ICSEM), pp. 13-16; Print ISBN: 978-1-4673-0914-1; Date of Conference: Oct. 20-21, 2012 . Abstract Only.

(56) References Cited

OTHER PUBLICATIONS

"Can New Cell Phone Blocking Technology Keep Prisoners Off the Line" Wireless & Cybersecurity Watch; Mar. 26, 2014; 5 Pgs; Retrieved From Internet May 6, 2015.

Devlin Barrett "CIA Aided Program to Spy on U.S. Cellphones" The Wall Street Journal Mar. 10, 2015; 5 Pgs. www.wsj.com/articles/cia-gave-justice-department-secret-phone-scanninf-techology-1426009924.

Jeff Stone "GPS Act Would Restrict Cops' Use of 'Stingrays' and Other Phone Surveillance Tech" International Business Times; Jan. 23, 2015; http://www/ibtimes.com/technology: 5 Pgs. Retrieved From Internet on May 7, 2015.

"The Efficacy of Managed Access Systems to Intercept Calls From Contraband Cell Hones in California Prisons" California Council on Science an Technology; May 2012; pp. 72.

"Managed Access CC1500" www.celularintercept.com/emon-prodshow/managed_accesss_cc1500html: 3 Pgs. Retrieved From Internet Sep. 28, 2015.

U.S. Appl. No. 14/865,308, filed Sep. 25, 2015.
U.S. Appl. No. 14/865,277, filed Sep. 25, 2015.
U.S. Appl. No. 14/865,400, filed Sep. 25, 2015.
U.S. Appl. No. 14/865,466, filed Sep. 25, 2015.

Nicholas W. Scott "Study of Cellular Phone Detection Techniques" http://digitalcommons.unl.edu/ceendiss; Apr. 2011; pp. 54. http://digitalcommons.unl.edu/cgi/viewcontent.cgi?article=1021&context=ceendiss.

Caroline Gabriel "Small Cells Inside the Enterprise—The Who, What & Where" © Maravedis—Rethink 2013; pp. 23; http://www.spidercloud.com/assets/pdfs/WP_Rethink_Enterprise_SmallCells_0613.pdf.

Enabling Mobile Phone Services Anywhere by Globecomm Systems, Inc. 2013; 2 Pgs. Retrieved From Internet Oct. 6, 2015; http://www.globecommsystems.com/pdf/wp-gsm-softswitch-article.pdf.

"Private Mobile Networks—Private GSM and IP Solutions" http://www.mobilecomms-technology.com/contractors/fixed-mobile-convergence/teleware; Aug. 13, 2013; pp. 3 Retrieved From Internet Oct. 6, 2015.

"Spectrum Analyzer Catches Cell Phone Cheats in Taiwan" http://www.darkreading.com/vulnerabilities-and-threats/spectrum-analyzer-catches-cell-phone-cheats-in-taiwan/d/d-id/1095482? : Jan. 14, 2011; pp. 2; Retrieved From Internet on Oct. 6, 2015.

\* cited by examiner

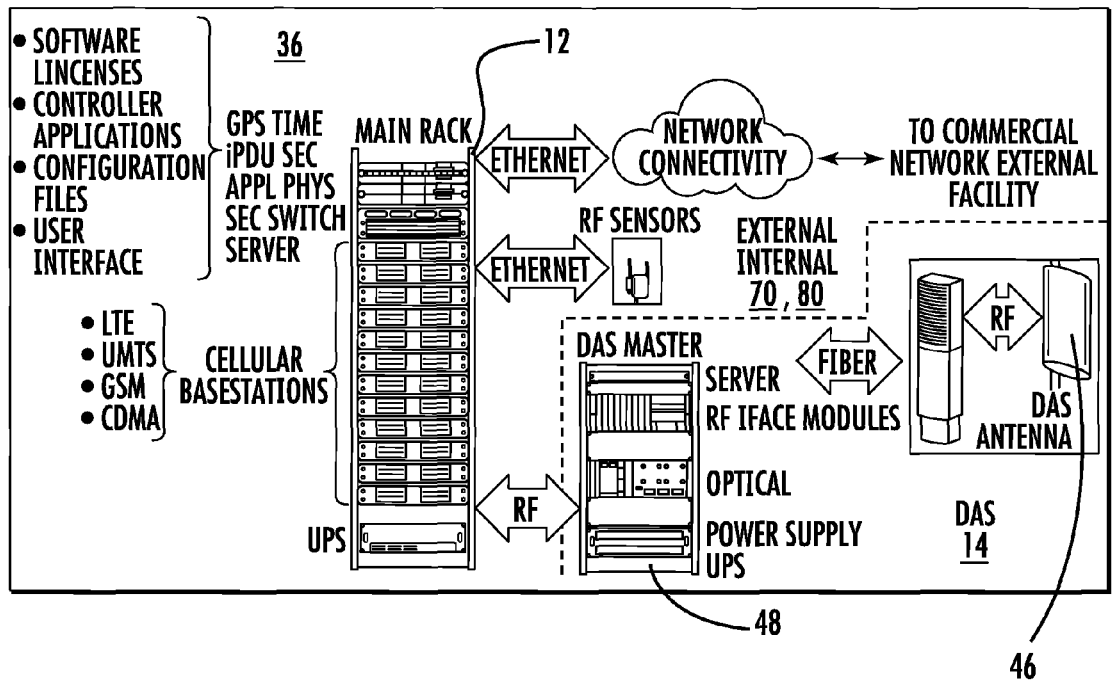
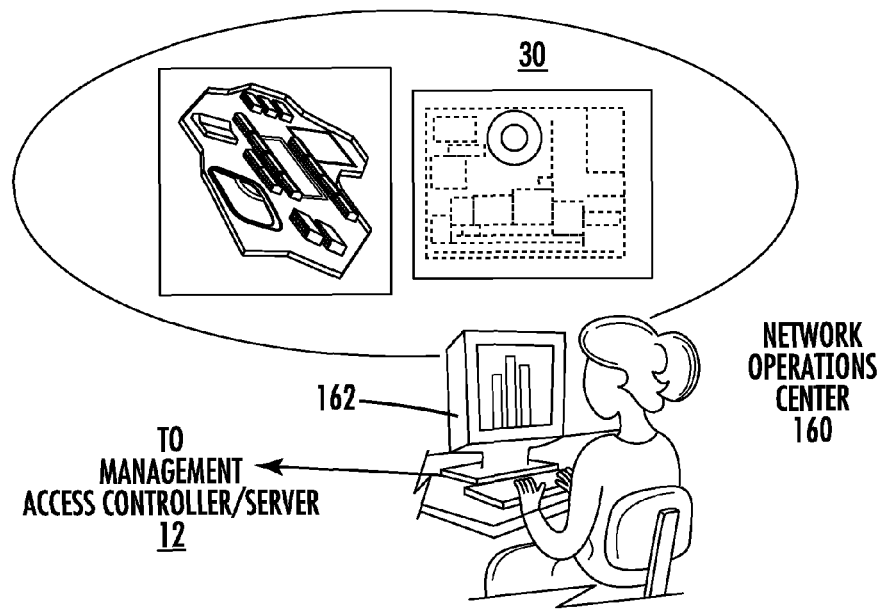
FIG. 6

| | AT&T | | SPRINT | | T-MOBILE | | VERIZON | | FTC COMM | US CELLULAR | TOTAL |
|---|---|---|---|---|---|---|---|---|---|---|---|
| CORE/BASE STATION | 700MHz BAND 17 | 1900MHz BAND 2 | 1900MHz BAND 25 | 800MHz BAND 26 | 1900MHz BAND 2 | 2100MHz BAND 4 | 700MHz BAND 13 | 850MHz BAND 5 | 700MHz BAND 17 | 850 BAND 5 | |
| | 1 | | | | | | | | | | |
| LTE BASE STATION | | 1 | | | | | | | | | 8 |
| | | | 1 | | | | | | | | |
| | | | | 1 | 1 | | | | | | |
| | | | | | | 1 | | | | | |
| CDMA-a BASE STATION | | 1 | | 1 | | | | | | | 4 |
| CDMA-b BASE STATION | | 1 | | | | | | 2 | | | 2 |
| CDMA-c BASE STATION | | | | | | | 1 | 4 | | | 4 |
| UMTS BASE STATION | | 2 | | | | | | | | | 2 |
| GSM BASE STATION | | 1 | | | 1 | | | | | | 2 |

FIG. 14

| AUTHORIZED DEVICES ⊖ | ✋ | 12:32:04, 2015.51.23 | 1xRTT | VOICE | C6F03D29 |
|---|---|---|---|---|---|
| | ✋ | 12:31:42, 2015.51.23 | 1xRTT | SMS | C3FB03C7 |
| | ✋ | 14:33:20, 2015.51.23 | GSM | SMS | 310120841564781 |
| REPORTS | ✋ | 12:33:02, 2015.51.23 | 1xRTT | SMS | C098AF34 |

INDICATES SWAPPED SIM DETECTED

| AUTHORIZED DEVICES ⊖ | ✋ | 12:32:04, 2015.51.23 | 1xRTT | VOICE | C6F03D29 |
|---|---|---|---|---|---|
| | ⊙✋ | 12:31:42, 2015.51.23 | 1xRTT | SMS | C3FB03C7 |
| | ✋ | 14:33:20, 2015.51.23 | GSM | SMS | 310120841564781 |
| REPORTS | ✋ | 12:33:02, 2015.51.23 | 1xRTT | SMS | C098AF34 |

SYSTEM STATE OPERATING ☐ EMERGENCY SHUTDOWN

FILTER [ALL] AUTHORIZED UNAUTHORIZED BLACK LISTED DEACTIVATED

| AUTH | TIME | TYPE | EVENT | IMEI/ESN | IMSI/MIN ▷ | NUMBER DIALED | | |
|---|---|---|---|---|---|---|---|---|
| ⊙ | 12:32:33, 2015.51.23 | LTE | DEREGISTRATION | 310410224588714 | 8754595824211155 | | | |
| ⊙ | 12:33:31, 2015.51.23 | EVDO | REGISTRATION | 311480448795648 | 554562285476332 | | | |
| ⊙ | 12:32:04, 2015.51.23 | 1xRTT | VOICE | C6F03D29 | 527451144243350 | 7412536545 | VIEW | LOCATE |
| ⊙ | 12:31:42, 2015.51.23 | 1xRTT | SMS | C3FB03C7 | 490115420323751 | 3219174214 | VIEW | LOCATE |
| ⊙ | 14:33:20, 2015.51.23 | GSM | SMS | 310120841564781 | 417586531245220 | 4741254741 | VIEW | LOCATE |
| ⊙ | 12:33:02, 2015.51.23 | 1xRTT | SMS | C098AF34 | 331251187485221 | 3218675309 | VIEW | LOCATE |
| ⊙ | 12:33:24, 2015.51.23 | 1xRTT | SMS | C098AF34 | 331251187485221 | 7412536545 | VIEW | LOCATE |

SYSTEM
DEVICE EVENTS ①
AUTHORIZED DEVICES ①
REPORTS
ALARMS
SETTINGS

MANAGED ACCESS SYSTEM WITH MONITORING DEVICE TO DETERMINE SYSTEM OPERABILITY

FIELD OF THE INVENTION

The present invention relates to communications systems, and more particularly, this invention relates to a managed access system for a mobile wireless device in a facility.

BACKGROUND

Over the last twenty years, the wireless telecommunications market has seen tremendous growth, including the use of contraband mobile wireless devices in correctional facilities or unauthorized use of such devices in other secure facilities, such as government offices. These devices are often smuggled into correctional facilities or other secure facilities and made available to unauthorized users, including inmates, which may use them to continue criminal enterprises outside the facility, threaten witnesses, and harass victims. Use of such devices may also pose a continued security risk in a correctional facility because the inmates may use them to coordinate inmate riots or direct retribution on guards, police or government officials.

It is difficult to prevent the smuggling of mobile wireless devices into correctional or other secure facilities because of commercial technology improvements and the variety of smuggling techniques available to unauthorized users and inmates. The improvements in commercial technology have reduced the size of mobile wireless devices and eased the challenges of smuggling or even accidentally carrying a mobile wireless device into a facility. Also, the accessibility of less expensive mobile wireless devices has placed these devices within the financial reach of most inmates or other unauthorized users. Though institutional security measurements are in place to attempt to prevent the smuggling of contraband into correctional facilities, the range of smuggling methods available to deliver contraband mobile wireless devices into the facility makes it difficult or even impossible to stop the flow. Inmates may coordinate smuggling efforts with visitors who move in and out of the facilities. Visiting friends and family are commonly involved in introducing contraband. Smugglers even employ methods such as throwing handsets over facility walls or fences, or concealing them in packages sent to the facility. Physical security measures alone may not be sufficient to prevent the introduction of mobile wireless devices into correction facilities or other secure facilities.

As smuggling cannot be reasonably prevented, alternative methods have been developed that focus on finding mobile wireless devices that are already inside the facilities. For example, some systems detect and locate contraband devices, which can then be confiscated. Often these systems include fixed, portable and handheld detection systems, but they can be expensive to acquire and require significant effort and personnel cost to use effectively. Their operational efficacy also is related to the effort that the facility invests in time, training, and technology. An increased effort from the facility may improve results, but it may also increase operational costs.

Because a cell phone's benefit to the user is its ability to access the commercial wireless network, denying the cell phone access to the wireless network may be a better approach to reduce the risks posed by contraband cell phones and other mobile wireless devices. The device is benign without access to the commercial wireless network.

A range of technology based approaches have been developed and are available to limit an unauthorized device's access to the commercial wireless network. These approaches include jammer technologies and access management approaches. There are several types of jammers, but they are typically designed to disrupt the communications of the device with the wireless communications network. One type of access management approach is a Managed Access System (MAS), which employs a private wireless network within a facility to provide wireless network access to authorized cell phones within the system's range. Authorized devices are provided access to voice and data services while unauthorized devices are denied access.

Another type of system, an Access Denial Service (ADS) works cooperatively with the commercial wireless network to deny access to unauthorized devices within a facility. An ADS system uses the interaction between cell phones and the network to determine if the cell phone is within a facility or not. When a cell phone is detected within the facility, the carrier is notified and if the device is not authorized for operation in the facility, it is prevented from future access to the wireless network by the carrier.

There are drawbacks to such systems. Geolocation devices alone will not provide sufficient detail on the device identification to enable action by the commercial service provider. Managed Access Systems may provide insufficient information to determine the location of a cellular device that has registered to their network. They can typically only identify that a device has attached, what has attached, and when it has attached. At best, it can identify which sector of a distributed antenna system the attachment has occurred. The system typically needs to operate on a persistent basis using fixed location, autonomous sensors.

SUMMARY OF THE INVENTION

A managed access system for mobile wireless devices (MWDs) in a facility that are geographically within a wireless communications network comprises a plurality of antennas arranged at the facility, radio equipment coupled to the plurality of antennas, and at least one MWD monitoring device for the wireless communications network. A management access controller cooperates with the radio equipment to communicate with a given MWD within the facility, block outside communications via the wireless communications network when the given MWD is an unauthorized MWD, and provide outside communications when the given MWD is an authorized MWD. The management access controller cooperates with the at least one MWD monitoring device to determine whether the radio equipment and at least one MWD monitoring device both detect the given MWD.

The managed access controller may be configured to generate an indication when one and not the other of the at least one MWD monitoring device and radio equipment detects the given MWD. The plurality of antennas may comprise a plurality of directional antennas arranged around a periphery of the facility. The at least one MWD monitoring device is operable for both cellular and non-cellular communications, and may comprise a plurality of external monitoring devices arranged around the periphery of the facility. The plurality of external monitoring devices may operate based on time-difference-of-arrival signals. The at least one MWD monitoring device may comprise a plurality of internal monitoring devices arranged within the periphery of the facility. The facility comprises a building and at least some of the plurality of internal monitoring devices are located within the building. The radio equipment may comprise a plurality of picocell radios, each coupled to a respective directional antenna. The management access controller may implement the corresponding change in the radio equipment as at least one of change in a power level of at least one of said picocell radios, a change in a communications protocol of at least one of said picocell radios, and a frequency range of at least one of said picocell radios.

The management access controller may provide outside communications when the given MWD is an authorized MWD via another network other than the commercial wireless network. The management access service may provide outside communications when the given MWD is an authorized MWD via at least one of the Public Switched Telephone Network (PSTN), and an Internet Protocol (IP) network. The radio equipment may be operable according to at least one of an LTE, CDMA, UMTS and GSM protocol.

A management access controller for a managed access system for mobile wireless devices (MWDs) in a facility, wherein the facility is geographically within a wireless communications network comprises a plurality of directional antennas arranged around a periphery of the facility, radio equipment coupled to the plurality of directional antennas, and at least one MWD monitoring device for the wireless communications network. The management access controller comprises a processor and a memory coupled thereto to cooperate with the radio equipment to communicate with a given MWD within the facility, block outside communications via the wireless communications network when the given MWD is an unauthorized MWD, and provide outside communications when the given MWD is an authorized MWD, and cooperate with the at least one MWD monitoring device to determine whether the radio equipment and at least one MWD monitoring device both detect the given MWD.

A method for operating a managed access system for mobile wireless devices (MWDs) in a facility that is geographically within a wireless communications network includes managed access system that comprises a plurality of directional antennas arranged around a periphery of the facility, radio equipment coupled to said plurality of directional antennas, and at least one MWD monitoring device for the wireless communications network. The method comprises operating a management access controller to cooperate with the radio equipment to communicate with a given MWD within the facility, block outside communications via the wireless communications network when the given MWD is an unauthorized MWD, and provide outside communications when the given MWD is an authorized MWD, and cooperate with the at least one MWD monitoring device to determine whether the radio equipment and at least one MWD monitoring device both detect the given MWD.

BRIEF DESCRIPTION OF THE DRAWINGS

Other objects, features and advantages of the present invention will become apparent from the detailed description of the invention which follows, when considered in light of the accompanying drawings in which:

FIG. 6 is a block diagram showing a management access controller in communication with directional antennae in accordance with a non-limiting example.

FIG. 14 is a table showing an example baseline cellular base station radio configuration in accordance with a non-limiting example.

FIG. 21 is an example screenshot of the graphical user interface showing mobile wireless devices with swapped SIM cards in accordance with a non-limiting example.

FIG. 22 is an example screenshot of the graphical user interface showing located mobile wireless devices in accordance with a non-limiting example.

DETAILED DESCRIPTION

Figure 1:
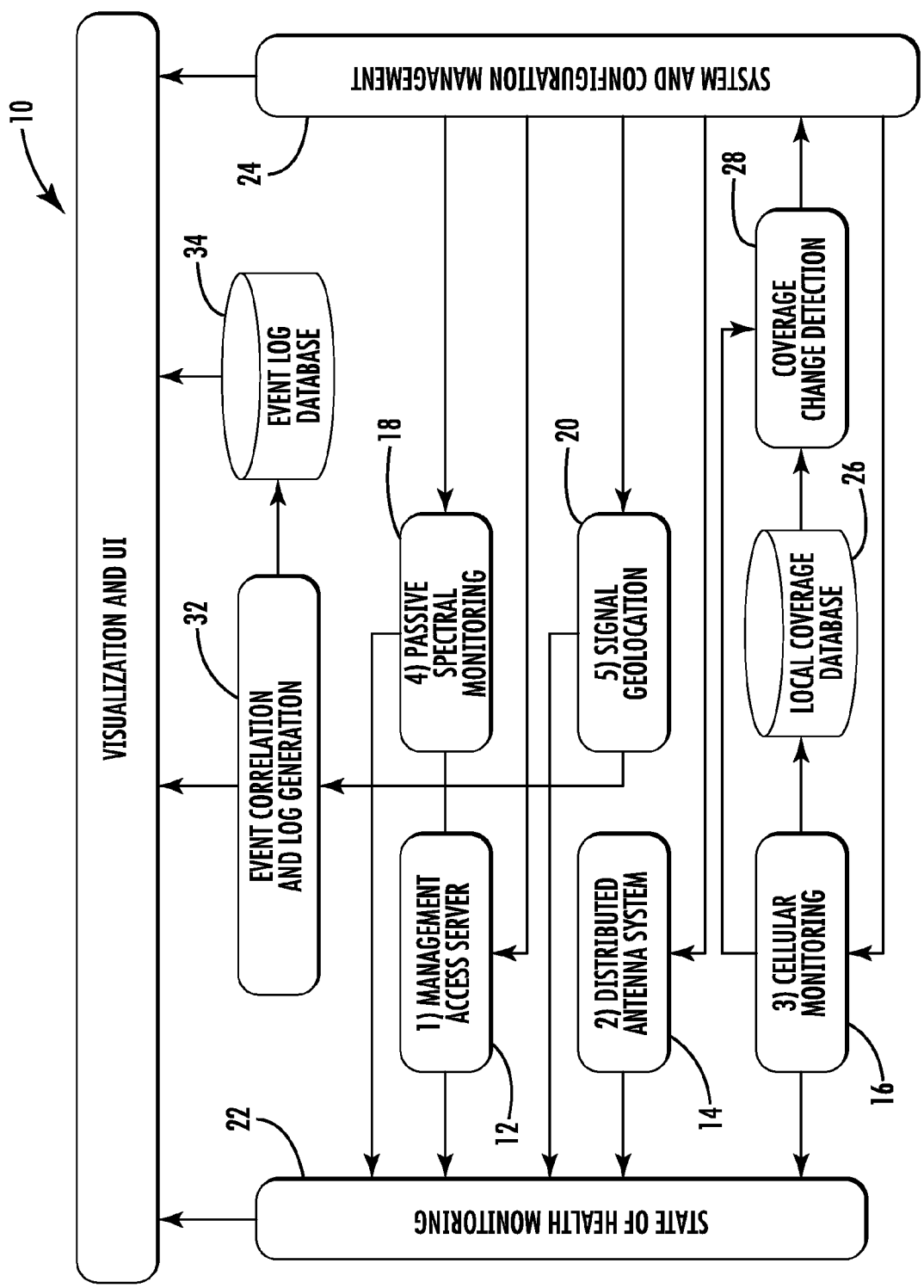
FIG. 1 is a block diagram showing functional components of the managed access system in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The managed access system, in accordance with a non-limiting example, permits communications from authorized mobile wireless devices and detects and disrupts wireless communications from unauthorized or contraband mobile wireless devices within a protected facility, such as a correctional facility. The different embodiments will be described relative to a correctional facility, but it should be understood that the managed access system, in accordance with a non-limiting example, may be used in many different facilities, including non-secure and secure buildings such as government offices, military compounds, corporate workplaces, and other areas where managed access systems may be implemented to detect and disrupt wireless communications from contraband and unauthorized mobile wireless devices, but permit authorized users to communicate either internally within the facility or with an outside commercial communications network.

The managed access system as will be described can be scaled to address a wide variety of wireless communication threats within a facility and mitigate the threat presented by contraband cellular and other unauthorized mobile wireless devices. The managed access system may be used to prohibit contraband and other unauthorized mobile wireless devices from accessing commercial voice and data networks. The system may provide a full-spectrum cellular service so that every mobile wireless device within the facility, regardless of commercial carrier or technology, e.g., as 4G LTE, 3G LTE, or other communication standards, is connected to the managed access system for both voice and data network communications rather than connected to any commercial networks.

Because local commercial cellular coverage varies from facility to facility, including a) the number of carriers, b) the technology mix of 2G, 3G and 4G standards, and c) the frequencies used by local carriers, the managed access system is built upon a modular system architecture and allows the communications technology mix to be optimized for any facility. For example, the managed access system may be reconfigured to address changes to the local communications environment and facilitate upgrades for future cellular and other communications technologies, such as 5G and beyond. The managed access system includes support for WiFi (802.11X) and other conventional radio technologies, including push-to-talk radios that can be added to the cellular core functionality to increase the diversity of the types of communications technology that can be detected and disrupted by the system. Drone detection capability may be implemented.

As will be explained in greater detail below, the managed access system is implemented after an initial site survey is performed where on-site data is collected to determine which commercial carriers are in the area and what cellular technologies and frequency bands cover the particular facility where the managed access system will be implemented. The collected data is used to determine the technology mix and frequency coverage necessary to provide effective cellular mitigation within the facility. To implement the managed access system, radio frequency (RF) propagation data for the facility is collected and provides empirical measurements to understand how signals propagate throughout the facility. This propagation data is used to design a Distributed Antenna System (DAS) using directional antennae and mitigate cellular access coverage from within the facility using a managed access system RF "bubble" over the facility. The empirical propagation data is used to predict signal levels in and around the facility. A cellular elevation survey is completed to determine the type and scope of infrastructure for improvements to support the managed access system RF "bubble." Once installed, the system is maintained and monitored, including continuous system alarm monitoring.

Referring now to FIG. 1, there is illustrated a high-level block diagram of functional components in the managed access system 10 for use in a facility such as a correctional facility, which is geographically located within a wireless communications network, for example, a conventional commercial communications network. The system 10 includes a management access controller or server 12 that cooperates with a distributed antenna system 14 formed from a plurality of directional antennae as explained in detail below. The system 10 provides cellular monitoring 16 to detect managed access system cellular mode of operation and detect changes in cellular coverage, passive spectral monitoring 18 to sense non-cellular devices, and signal geolocation 20 using a series of internal and external sensors, as will also be explained in greater detail below. The system 10 provides state of health monitoring 22 and system and configuration management 24 to manage the configuration of the managed access system RF "bubble." A local coverage database 24 stores information regarding commercial carriers and devices. Changes in commercial coverage can be detected 28 using the cellular monitoring 16, and changes may be made to the distributed antenna system 14 and other components as necessary. The system includes a graphical user interface 30 where an overlay of the facility can be viewed, data input and system changes made. Events are correlated 32 and logged, for example, an event corresponding to the determination of an unauthorized user. Reports are generated and events stored in an event log database 34 and records kept of different events, for example, when an unauthorized user is detected. The graphical user interface 30 provides a common interface for monitoring operation of the system 10. Data is collected, fused and displayed on the graphical user interface 30 to show the operating environment within the facility. System state of health information can be viewed on the graphical user interface 30.

Figure 2A:
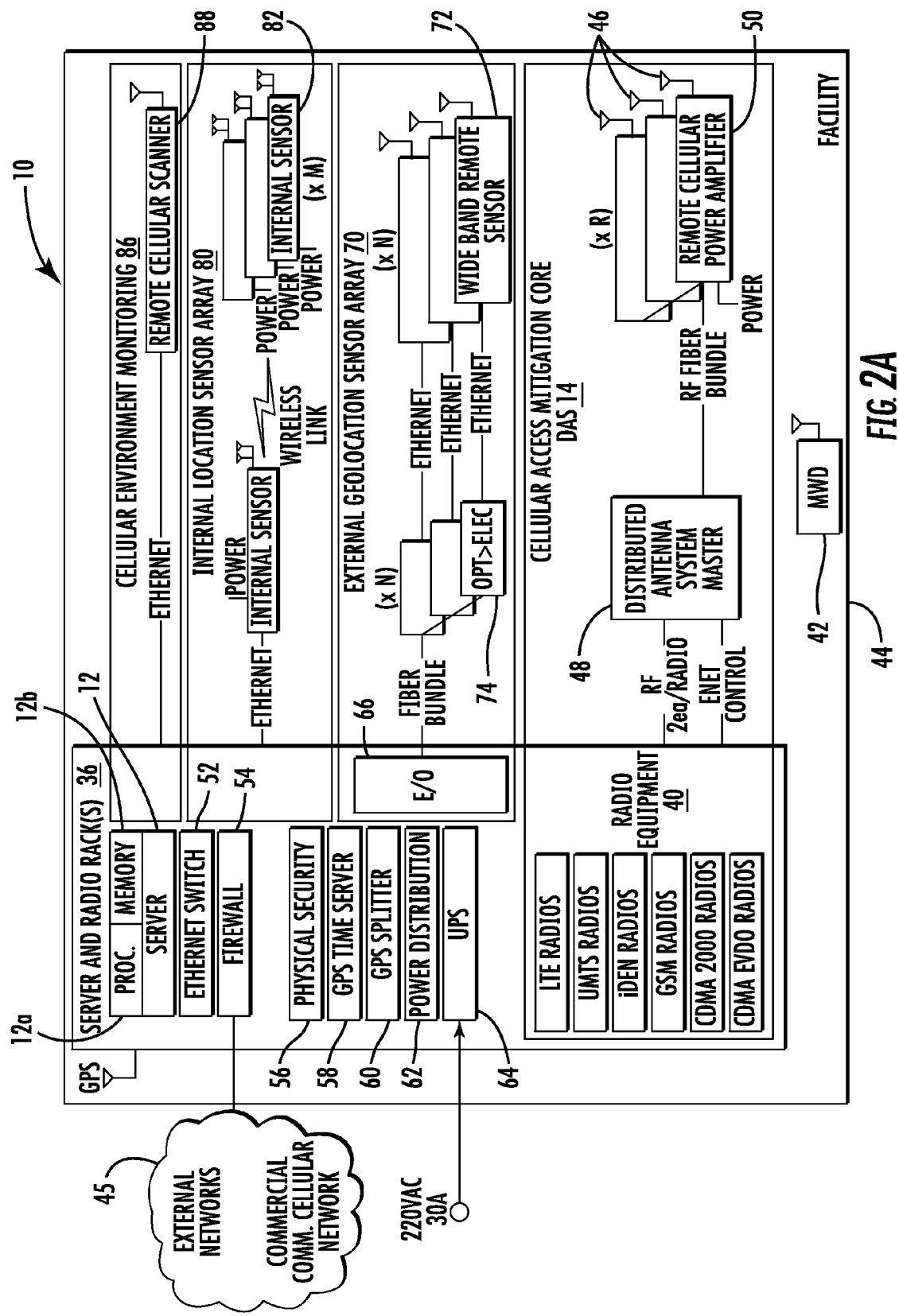
FIG. 2A is a more detailed block diagram of the managed access system in accordance with a non-limiting example.

Referring now to FIG. 2A, there is shown a more detailed, high-level block diagram of the managed access system 10, which includes the management access controller 12 that is formed as a server and a segment of a radio or server rack 36. The term "controller or server" may be used interchangeably when referring to the management access server, and the server includes a processor 12a and a memory 12b coupled thereto. The management access server 12 cooperates with radio equipment 40, such as picocell radios to communicate with a given mobile wireless device 42 within the facility 44, and blocks outside communications from a commercial wireless communications network 45 when the given MWD is an unauthorized MWD, and provides outside communications when the given MWD is an authorized MWD. The management access server 12 interoperates with the distributed antenna system 14 that includes a plurality of directional antennas 46 arranged around a periphery of the facility 44 and includes a distributed antenna system master "controller" or server 48. Each directional antenna 46 interoperates with the radio equipment 40 via the distributed antenna system master 48 and remote cellular power amplifiers 50. The radio equipment 40 may include different radios, including LTE radios, UMTS radios, IDEN radios, GSM radios, CDMA 2000 radios, and CDMA EVDO radios in this example. Other radios for communicating with mobile wireless devices 42 may be used depending on the type of coverage provided within and around the facility 44.

The management access server 12 interoperates with an Ethernet switch 52 and includes a network firewall 54, physical security 56, e.g., locks for the rack 36, a GPS time server 58, GPS splitter 60, power distribution circuits 62 and UPS (uninterrupted power supply) 64. The management access server 12 interoperates through an electrical-to-optical (E/O) interface 66 to at least one external geolocation device that is formed as an external geolocation sensor array 70 and includes wideband remote sensors 72 as external geolocation devices, which are operable for both cellular and non-cellular communications to detect those signals in the facility 44. These wideband sensors 72 are arranged around the periphery of the facility in a non-limiting example, and may communicate using an Ethernet connection via optical/electrical converters 74 and interconnect via an optical fiber bundle to the electrical/optical interface 66 and the management access server 12.

An internal location sensor array 80 is arranged within the periphery of the facility 44, and in an example, located within a building. Internal geolocation devices are sensors 82 that may connect via wireless link to each other and via Ethernet to the management access server 12.

The system 10 includes cellular environmental monitoring 86 of the wireless communications network and includes a remote cellular scanner 88 that connects via Ethernet connection to the management access server 12. The monitoring device 86 determines a change in the wireless communications network as a commercial network, for example, and implements a corresponding change in the radio equipment 40 such as a change in the power level of one of the picocell radios, a change in communications protocol, and/or a frequency change. Such protocols could include data and address formats, address mapping changes, routing changes, change in acknowledgement systems, change in direction of data flow, and changes in sequence and flow control.

It is possible to change different communication standards, including TCP/IP models and protocol layering with different encapsulation data formats. Changes in software layering are possible. Different network protocols can be used. Power levels may be changed to increase or decrease the power in towers connected to radio equipment 40 and directional antennas 46. Frequency changes may occur with changes in protocol or depending on what occurs at the wireless communications network 45 such as commercial networks. Frequencies can vary depending on what other outside communication networks are used or other transmitters and radio sources are monitored and determined near the facility to adjust HF, VHF, UHF, and other frequency ranges, including those in the cellular commercial band. Different carriers have different frequencies, including frequency bands such as 3G, 4G, GSM, IS-95 as CDMA, 3G, and 5G. Different bands include the 700, 800, 850, 1400, PCS, AWS, and BRS/EBS frequency bands. These are non-limiting examples only. Power may also depend on the type of cell such as use of a picocell that is a small cellular base station covering a small area such as a shopping mall or train station. The system allows an authorized user to connect into a commercial carrier network that provides roaming services so that even if an authorized user of a mobile wireless device is not able to connect directly to their carrier they use on their mobile wireless device, it is possible to connect into a commercial carrier network that could be the same as the wireless communications network around a facility or a different network that provides roaming services. The system is deployable on cruise ships, oil platforms, and in mines as non-limiting examples.

An example could be a change in the wireless communications network 45 such as the addition of a rogue base station. The management access server 12 would be changed and configured to block communications from any mobile wireless device (MWD) 42 with that rogue base station. The management access server 12 also may provide outside communications when the given mobile wireless device is an authorized mobile wireless device using a Session Initiation Protocol (SIP) and provide outside communication when the given mobile wireless device is an authorized mobile wireless device via another network other than the commercial wireless network, such as a land-line connection via the Public Switched Telephone Network (PSTN). Another network could be used, such as an Internet Protocol (IP) network.

The managed access system 10 provides both the signaling and services for all cellular devices within the facility 44 and uses strategic channel selection, parameter configuration, and signal dominance. For example, the management access server 12 strategically selects channels used to establish the voice and data network within the facility 44 and may configure key parameters of the system 10 to attract cellular and other mobile wireless devices 42 to the system while making the commercial cellular network 45 unavailable. This can be accomplished using a) signal dominance, such as delivering a higher power, b) delivering a better quality signal, and c) adjusting other parameters relative to the commercial carrier network 45 to help ensure that the managed access system 10 provides a cellular voice and data network that is the strongest and most attractive signal within the facility as seen by cellular or other mobile wireless devices 42 and block any device from connecting directly to the commercial communications network 45. The system 10 is effective for use with smart phones, tablets, cell phones, modems and other types of wireless devices that use cellular technology and other radio frequency communications to access voice or data networks.

As noted before, because commercial cellular carrier coverage varies between different facilities, to optimize the system for a particular facility, a survey of the cellular network in and around a facility 44 is first completed. The collected data determines the technology mix and frequency coverage necessary to provide the effective cellular mitigation within the facility 44. Using this data, the RF "bubble" is created around the facility using the distributed antenna system 14 and its individual directional antennas 46. Inside the RF bubble, all cellular and other mobile wireless devices 42 connect to the management access server 12 while outside the RF "bubble," cellular and other mobile wireless devices operate as normal by connecting to the available commercial communications network 45. Use of the management access server 12 and radios 40 connected to the directional antennas 46 allow the size and shape of the RF bubble to be contoured and tailored to the facility 42 by selecting specific antenna locations and RF power levels for each unique signal.

As noted before, it is possible to have a roaming partnership with commercial carriers to give the flexibility to use authorized mobile wireless devices 42 in their fullest commercial capability. Nothing has to change with the billing involved with the commercial carrier. The management access server 12 may provide the device either all, some, or none of the services inside the "bubble" on a case-by-case basis. The system may push a mobile wireless device 42 to a SIP, a voice connection, or PSTN and move from the cellular network as noted before.

Also, the management access server 12 may cooperate with the at least one MWD monitoring device 88 to determine whether the radio equipment 40 and at least one MWD monitoring device 88 both detect the given mobile wireless device and may generate an indication or alarm when one and not the other of the at least one MWD monitoring device and radio equipment detects the given MWD. The system 10 is tiered so that the indication or alarm could indicate that the MWD is outside the facility and beyond the fence line, for example, when the monitoring device 88 detects the device, but not the radio equipment 40.

Figure 2B:
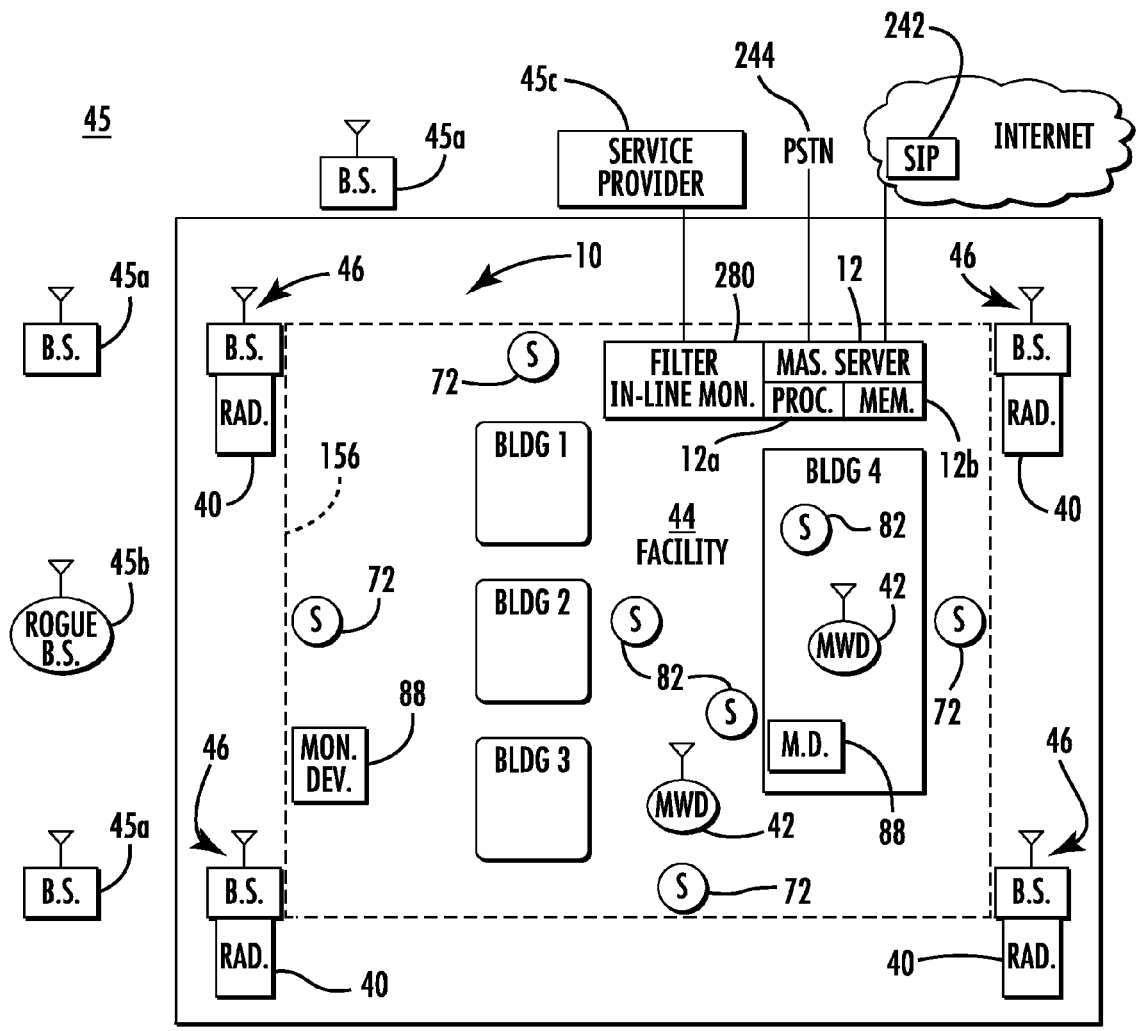
FIG. 2B is another block diagram of the managed access system showing the facility and location of different devices in accordance with a non-limiting example.
Figure 4:
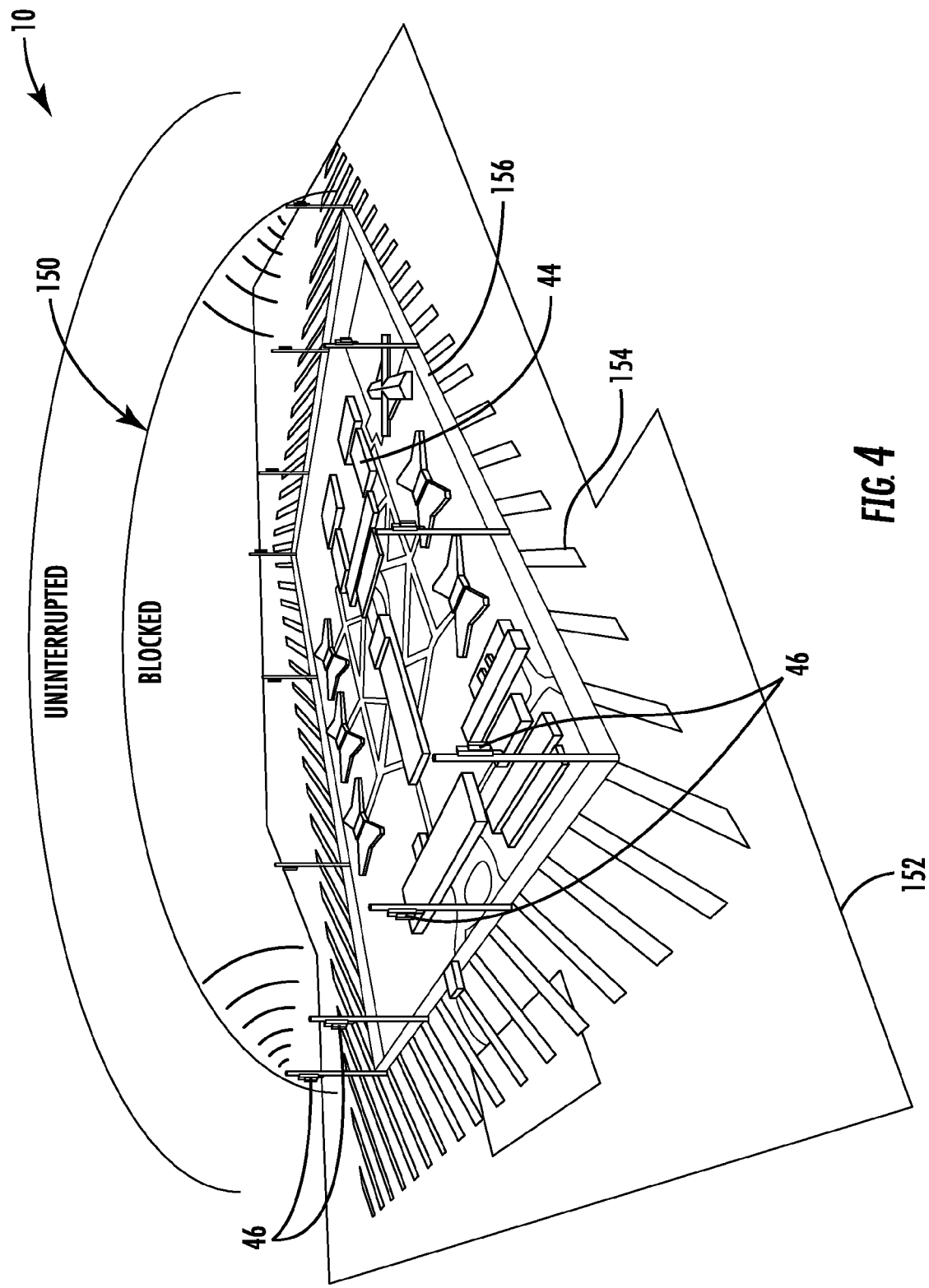
FIG. 4 is an environmental view of the managed access system for a facility showing directional antennas forming an area of blocked communications in accordance with a non-limiting example.

FIG. 2B is a block diagram showing a general layout of the managed access system 10 for the mobile wireless devices 42 in a facility 44 that is geographically within the wireless communications network 45 such as a network of a commercial carrier. The network 45 includes a number of base stations 45a. As illustrated, the managed access system 10 includes a plurality of directional antennas 46 with associated base stations that are arranged around a periphery of the facility 44, such as defined by a fence line 156 as also shown in FIG. 4, with radio equipment 40 coupled to the plurality of directional antennas 46. The radio equipment 40 could be located in the central server and radio rack 36 located at or near the management access controller 12. The radios 40 could be located at the individual directional antennas 46 formed as cell towers in this example. At least one MWD geolocation device for the wireless communications network interoperates with the management access controller 12 and cooperates with the radio equipment 40 to communicate with a given MWD 42 within the facility 44, block outside communications via the wireless communications network 45 when the given MWD is an authorized MWD and provide outside communications when the given MWD is an authorized MWD. The management access controller 12 operates with the at least one MWD geolocation device to locate the given MWD within the facility 44. As noted before, the management access controller 12 is also termed the management access server and includes a processor 12a and memory 12b as noted before.

The at least one MWD geolocation device is operable for both cellular and non-cellular communications whether it is internal or external, and in one embodiment, includes a plurality of external geolocation devices 72 forming an external sensor array and arranged around the periphery of the facility as the wideband remote sensors. These devices as the sensors 72 may operate based on the time-difference-of-arrival signals. Another series of MWD geolocation devices include a plurality of internal geolocation devices 82 as internal sensors and arranged within the periphery of the facility, and in an example, within a building (B) as described later. The radios 40 may be picocell radios each coupled to a respective directional antenna 46.

Figure 11:
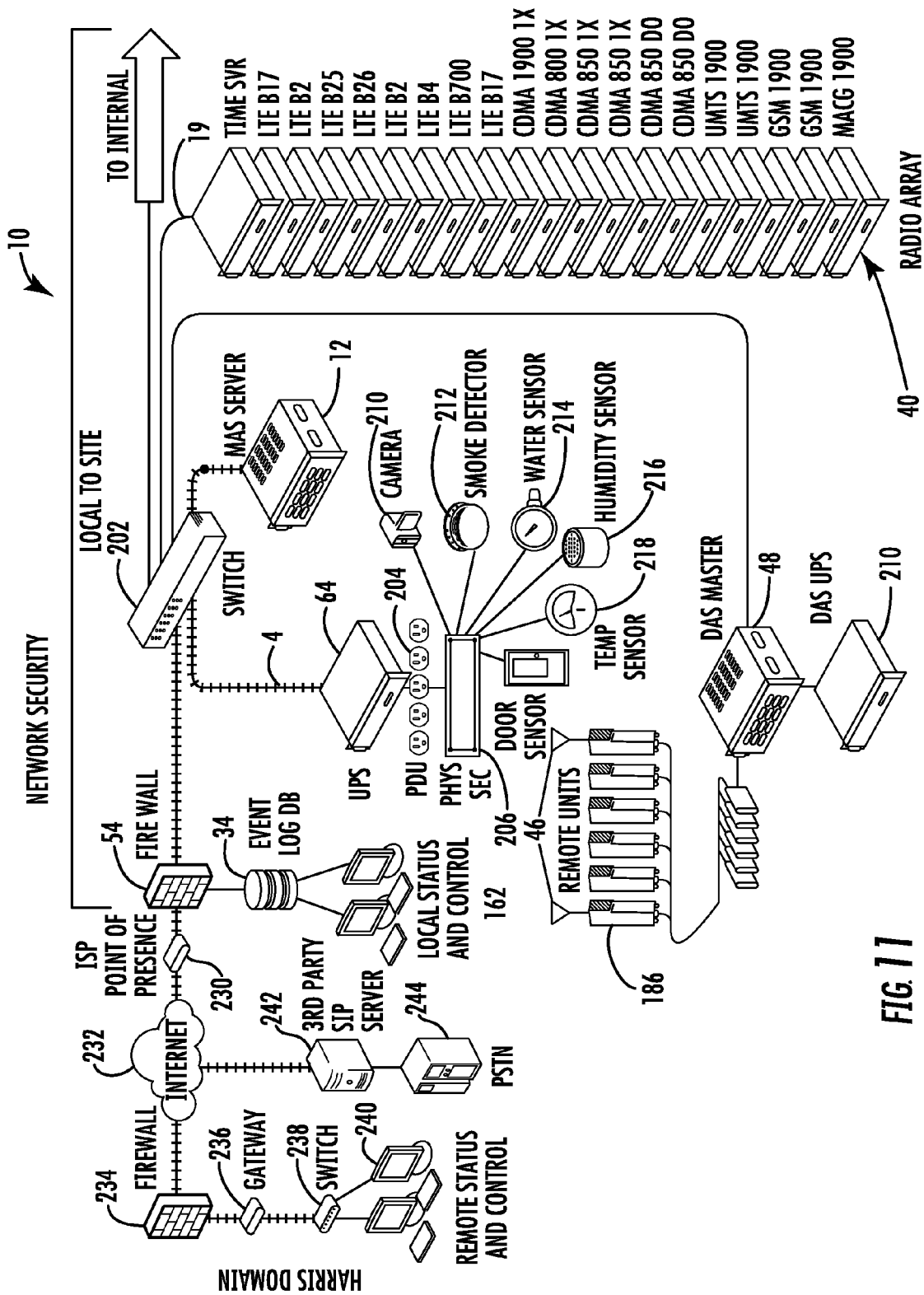
FIG. 11 is a fragmentary block diagram of network security for the managed access system in accordance with a non-limiting example.

The management access server 12 may implement a corresponding change in the radio equipment 40 in response to a change in the wireless communications network 45 of at least one of a change in the power level of at least one of the picocell radios, a change in a communications protocol of at least one of the picocell radios, and a frequency range of at least one of the picocell radios. This allows an RF "bubble" to form around the facility, and which the RF bubble can be maintained and adjusted as necessary. The management access server 12 may provide outside communications when the given MWD 42 is an authorized MWD via another network other than the wireless communications network 45 such as through the Public Switched Telephone Network (PSTN) 244 and/or an Internet Protocol (IP) network such as through an SIP server 242 (FIG. 11). The radio equipment 40 may be operable according to one of at least a LTE, CDMA, UMTS and GSM protocol as noted before.

As illustrated, the facility 44 includes at least one monitoring device 88 for the wireless communications network. The management access server 12 may cooperate with the monitoring device 88 to determine a change in the wireless communications network and implement a corresponding change in the radio equipment 40 to adjust the radio equipment and adjust the RF "bubble." This is advantageous such as when a rogue base station 45b is monitored and determined to be active in causing a change in the RF "bubble" such that the rogue base station communicates with a MWD within the facility. The management access server 12 may block communications with the rogue base station 45b. The management access server 12 may also cooperate with at least one MWD monitoring device 88 to determine whether the radio equipment 40 and at least one MWD monitoring device both detect the given MWD and operate to determine if the system is operating.

The management access server 12 also cooperates with the at least one MWD geolocation device as external or internal sensors 72, 82 to determine that a given MWD is within the facility and compares an identification of the given MWD to a list of authorized MWDs and determine whether a given MWD is unauthorized or authorized. It may coordinate with the wireless communications network 45 to block outside communications when the given MWD is an authorized MWD, provide outside communications via the radio equipment 40 and the wireless communications network 45 when the given MWD is an authorized MWD. It may block the outside communications when the given MWD 42 is an authorized MWD based upon a coordinated access denial with the wireless communications network 45 by allowing the base stations 45*a* and a service provider 45*c* of the wireless communications network to prevent communications. As illustrated, a network interface device 280 operates as an in-line ID monitor or filter to the wireless communications network and configured to communicate with MWDs 42 via the radio equipment and compare an identification of a given MWD to a list of authorized MWDs to determine whether the given MWD is authorized or unauthorized. The management access server 12 will filter communications between an unauthorized MWD and the network interface device that is configured to provide communications with the communications carrier. Communications will pass between an authorized MWD and the network interface device. The identification of the given MWD may be an International Mobile Subscriber Identity (IMSI).

Figure 3:
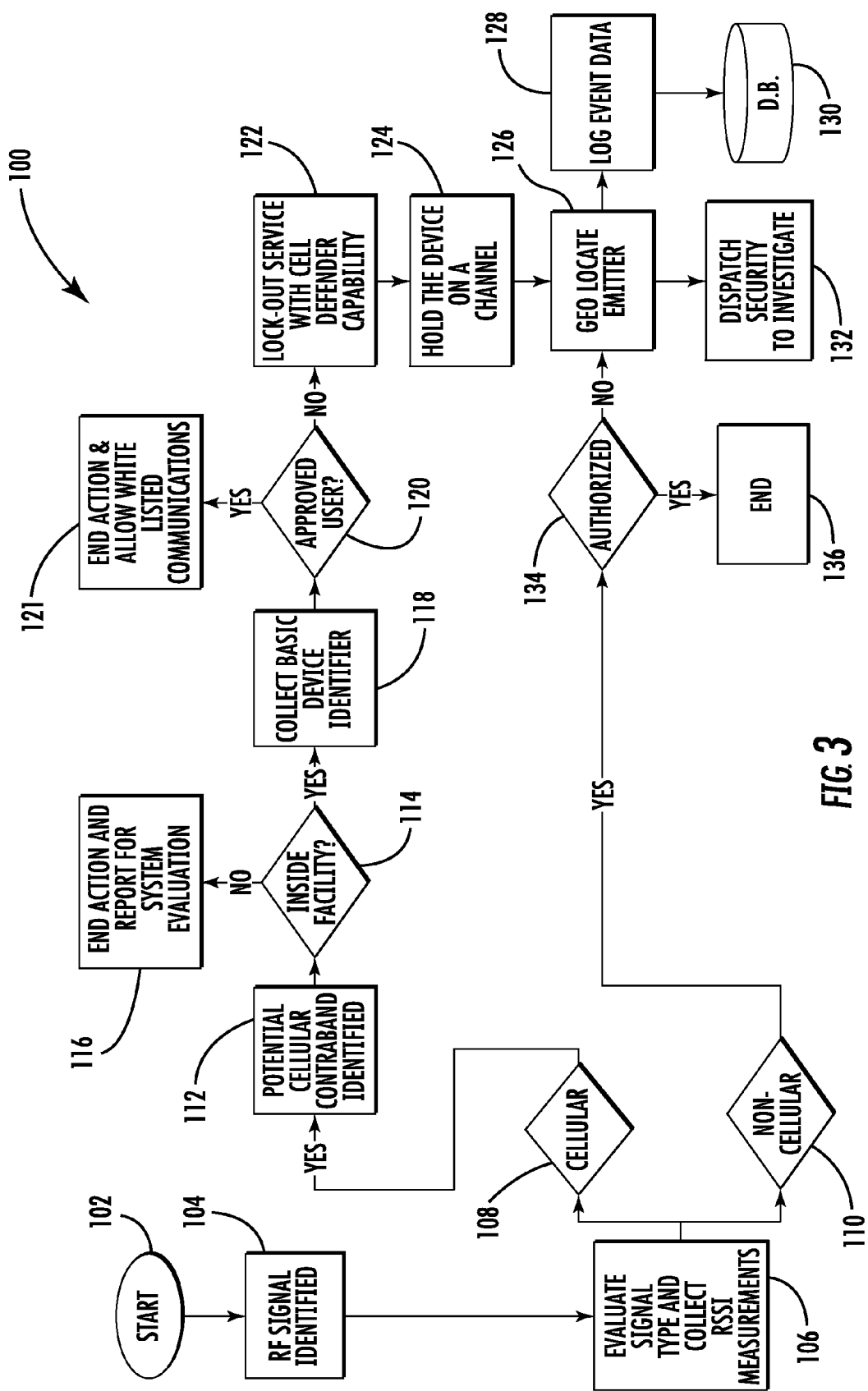
FIG. 3 is a flow diagram showing a method of operation for the managed access system in accordance with a non-limiting example.

FIG. 3 is a high-level flow diagram 100 showing a basic sequence of operation for the managed access system 10. The process starts (block 102) and an RF signal is identified (block 104). The signal is evaluated as to the type and its RSSI (received signal strength indication) measurements collected (block 106). The management access server 12 makes a decision whether the signal is cellular (block 108) or non-cellular (block 110). If cellular (block 108), the potential cellular or other contraband mobile wireless device is identified (block 112) and a determination is made whether that potential cellular contraband as a potential unauthorized mobile wireless device is inside the facility (block 114). If not, the action ends and is reported for system evaluation (block 116). If the potential cellular or other mobile wireless device contraband is a potential unauthorized mobile wireless device inside the facility, then the basic device identifier is collected (block 118). A determination is made whether the user is approved (block 120), and if yes, the action ends and the user is white listed for permissible communications either inside the facility or to other devices outside the facility (block 121). If the user is not approved, then the management access server 12 will lock-out that particular user's mobile wireless device from the system 10 and the user will not be able to communicate using their device since it is an unauthorized device (block 122). The device may be held on a communications channel (block 124), however. The unauthorized device as the contraband cell phone or other unauthorized mobile wireless device is geolocated using the various geolocation devices, including the internal and external sensor arrays 70, 80 (block 126). Once geolocated, the geolocation "event" is correlated and logged as log event data (block 128) and can be stored in the event log database 34 (block 130). Also, security may be dispatched to investigate after the device is geolocated (block 132).

After the signal is evaluated for its type and the RSSI measurements collected and a determination has been made the device is non-cellular (block 110), a determination is made whether the device is authorized (block 134) and if not, it is geolocated (block 126). If the device is authorized, then the process ends (block 136).

FIG. 4 illustrates an example RF "bubble" 150 formed by the managed access system 10 using the plurality of directional antennas 46 arranged around the periphery of the facility 44 and showing the areas of blocked communications and area of uninterrupted communications towards the property line 152. A potential interruption area 154 is located near the fence line 156 where the directional antennas 46 are positioned. The managed access system 10 is able to detect and disrupt unauthorized cellular communications inside the outermost perimeter fence line 156 of the facility, including all indoor and outdoor areas. The coverage area extends to the perimeter fence line 156 with sufficient signal strength to ensure that cellular and other mobile wireless devices 42 connect to the managed access system 10. Some signals may propagate beyond the perimeter fence line 156 and the coverage are for the RF bubble 150 can be customized so that signal propagation outside the perimeter fence line 156 is minimized to ensure emissions do not disrupt any commercial carrier service beyond the property line 152. In one example, the signal target level from the directional antennae 46 may be 60 dB stronger than commercial carrier signals at the perimeter fence line 156. At the property line 152, the signals from the directional antenna 46 may be 3 dB weaker than commercial carrier signals or less than −105 dBm as absolute channel power.

Figure 5:
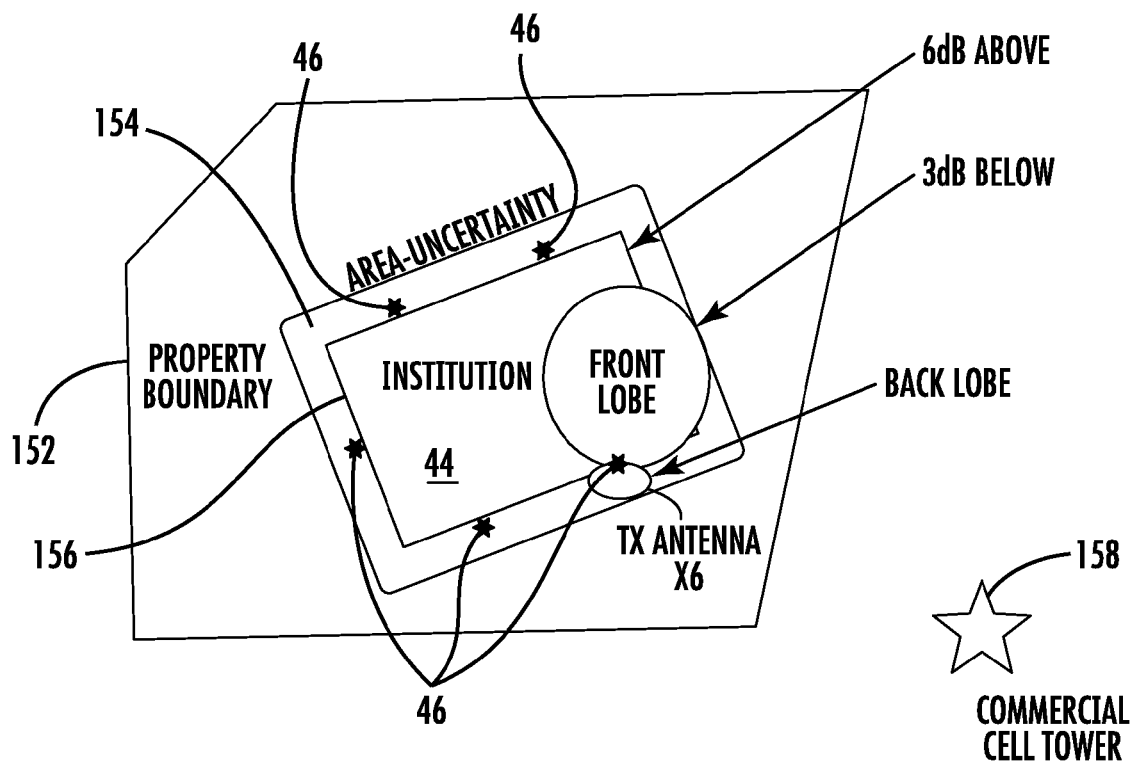
FIG. 5 is a plan view of the facility showing an area of uncertainty and location of directional antennas in accordance with a non-limiting example.

FIG. 5 is another schematic plan view of the facility 44 similar to that shown in FIG. 4, showing the directional antennas 46 positioned around the facility 44, and illustrating a zone of uncertainty as the interruption area 154 and showing the property boundary line 152 with the antenna front lobe forming the desired 6 dB power signal level stronger than commercial carrier signals at the perimeter fence line 156. This is created by having the front antenna lobe from the directional antenna stronger than its rear or back lobe with the resulting 3 dB signal weaker than the commercial carrier signals or less than −105 dBm as absolute channel power at the area of uncertainty 154 and extending into the property boundary line 152 so that commercial carrier signals are not impacted beyond the property boundary line 152. A commercial cell tower as an example is illustrated at 158 and any of its communications signals extending beyond the property boundary line 152 should not be adversely affected.

The Distributed Antenna System (DAS) 14 includes the plurality of directional antennas 46, which in this example are positioned at a height of about 10 meters for this example correctional facility. In one example, twelve (12) directional antennas 46 are used in the example shown in FIG. 4 and six are used in the example of FIG. 5. Another directional antenna 46 may be located at the central portion of the facility 44.

An example directional antenna 46 is an antenna manufactured and sold by Galtronics under the EXTENT™ tradename such as a model D5778I. These example antennas are designed as 60°/60° narrow beam directional antenna with an operating range of 698-960 MHz and 1695-2700 MHz and adapted as a broadband directional, single-sector MIMO antenna for high-capacity venues. Each directional antenna 46 is connected to a radio 40, which in one example is a picocell commercial radio as noted before and shown diagrammatically in FIG. 2A and via the DAS master server 48.

Figure 7:
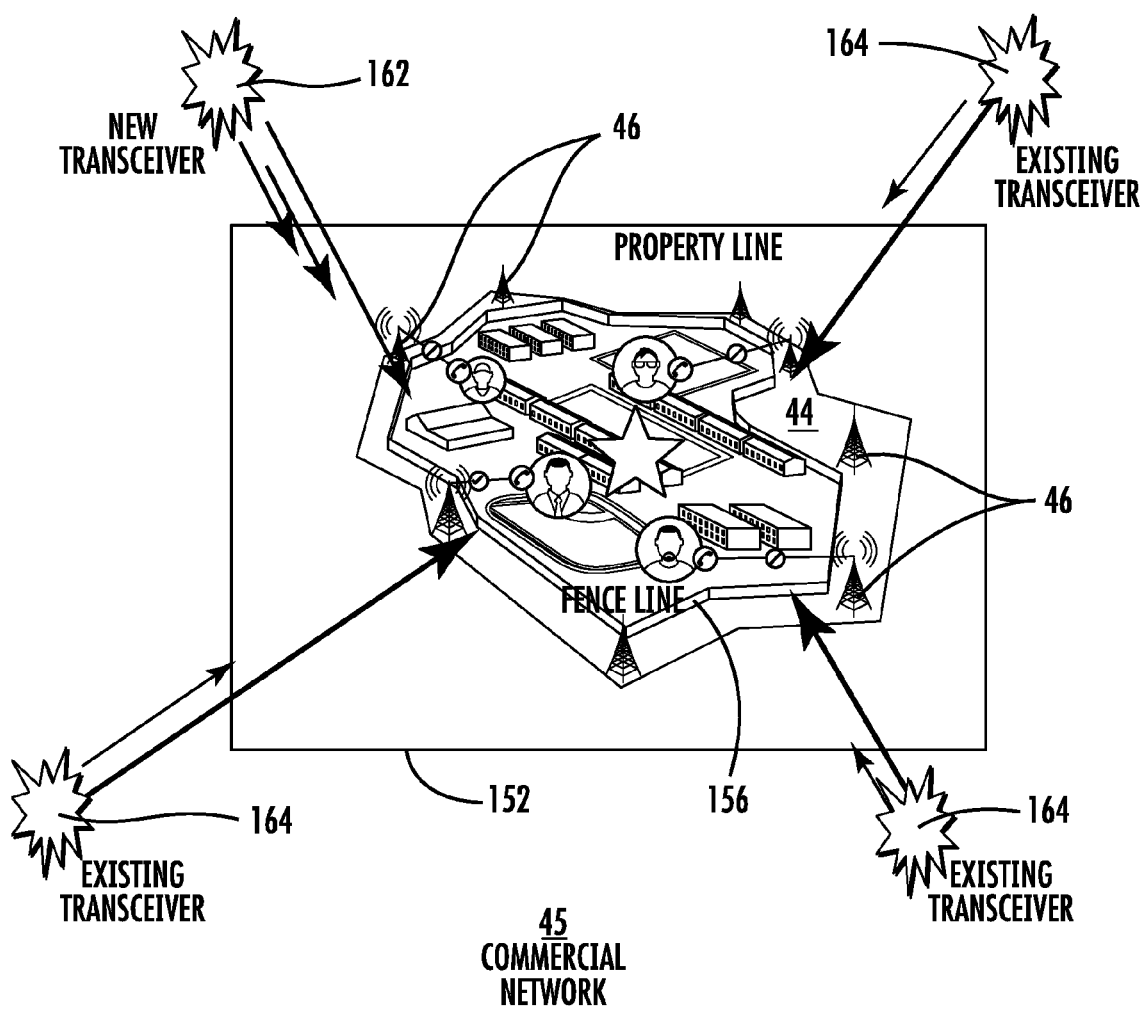
FIG. 7 is another environmental view of the managed access system for a facility showing the wireless communications network formed by existing and new transceivers in accordance with a non-limiting example.
Figure 8:
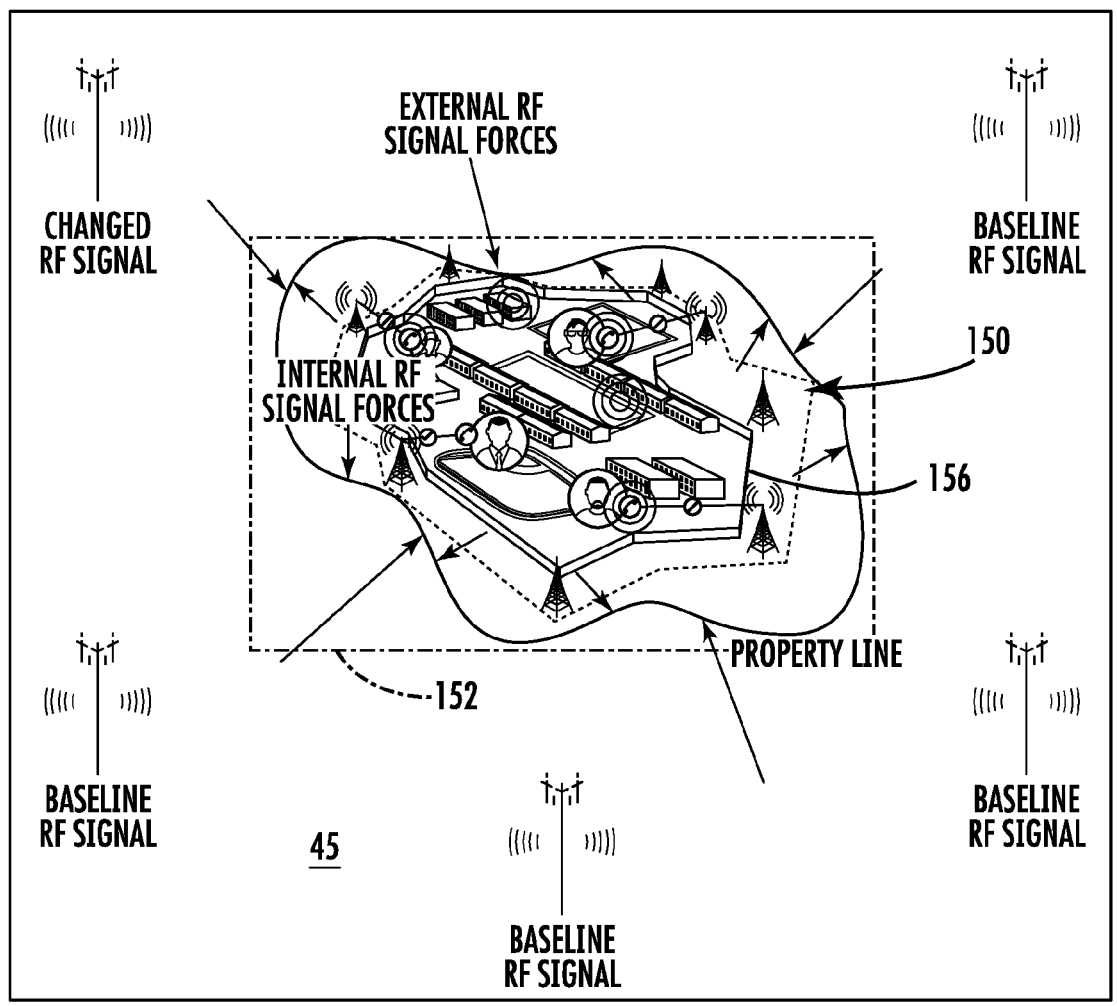
FIG. 8 is a fragmentary plan view of the managed access system similar to that shown in FIG. 7 and showing the effect of a changed RF signal from the wireless communications network in accordance with a non-limiting example.

The distributed antenna system 14 is controlled via the DAS master server 48 by the management access server 12 that includes its main server or radio rack 36 as illustrated in FIG. 6. The management access server 12 provides a graphical user interface 30 as explained above that can be controlled at a network operations center (NOC) 160 from a remote operator station 162 as illustrated. Authorized and unauthorized mobile wireless devices are detected as illustrated in the representation of the graphical user interface 30 shown in FIG. 6. The management access server 12 may implement corresponding changes in the radio equipment 40 such as a) changing the power level in one of the picocell radios, b) changing communications protocol in at least one of the picocell radios, and/or c) changing a frequency range of at least one of the picocell radios. For example, if a new transceiver 164 is added to existing and known transceivers 166 forming the commercial network 45 as located near the property line 152 of the facility such as shown in FIG. 7, the external RF signal forces exerted against the facility 44 will change because of the changed RF signal. An example of this scenario is shown in FIG. 8. When the baseline RF signal changes, the DAS 14 will make corresponding changes to one or more directional antennas 46 to compensate for the external RF signal forces that had changed the internal RF signal forces to maintain the RF "bubble" 150.

The management access server 12 with the corresponding DAS master server 48 are contained in a secure facility such as a communications closet on site at the facility 44 and in a cooled location and includes easy power access and a ready optical fiber connection. The directional antennae 46 connect by optical fiber to the DAS master server 48, which includes the appropriate processor, RF interface modules, optical modules, power supply, and UPS as shown in FIG. 6. The DAS master server 48 connects via RF in one example to the management access server 12. The server or radio rack 36 for the management access server 12 and rack for the DAS master server 48 in one example are 42 U and 19-inch trays. In one example, the management access server 12 includes an HPDL 380 GENS 64G RAM 2 TB hard drive and a 48 port GigE switch 52 and a GigE firewall 54 (FIG. 2A). The management access server 12 includes the UPS 64, PDU 62, and a GPS splitter 60 with the locks for physical security 56 (FIG. 2A), e.g., a locking 42 U 19-inch rack with an RF patch panel, radio trays, and a managed access carrier GEN (MACG). The main server and radio rack 36 includes enhanced physical security with door locks and door ajar sensors, and the additional security features of water, humidity, temperature and smoke sensors. A camera may be implemented to capture the area for breaches and use NETBOTZ physical security appliance and accessories. The GPS time circuit 58 provides GPS time to the rack equipment via Ethernet. The GPS splitter 60 splits and amplifies the GPS RF antenna signal to the rack equipment. The PDU 62 provides 220 VAC with power sockets for the racked equipment and provides remote power on/off, voltage, and amperage reading per plug and rack and provides alarms on faults.

Figure 9:
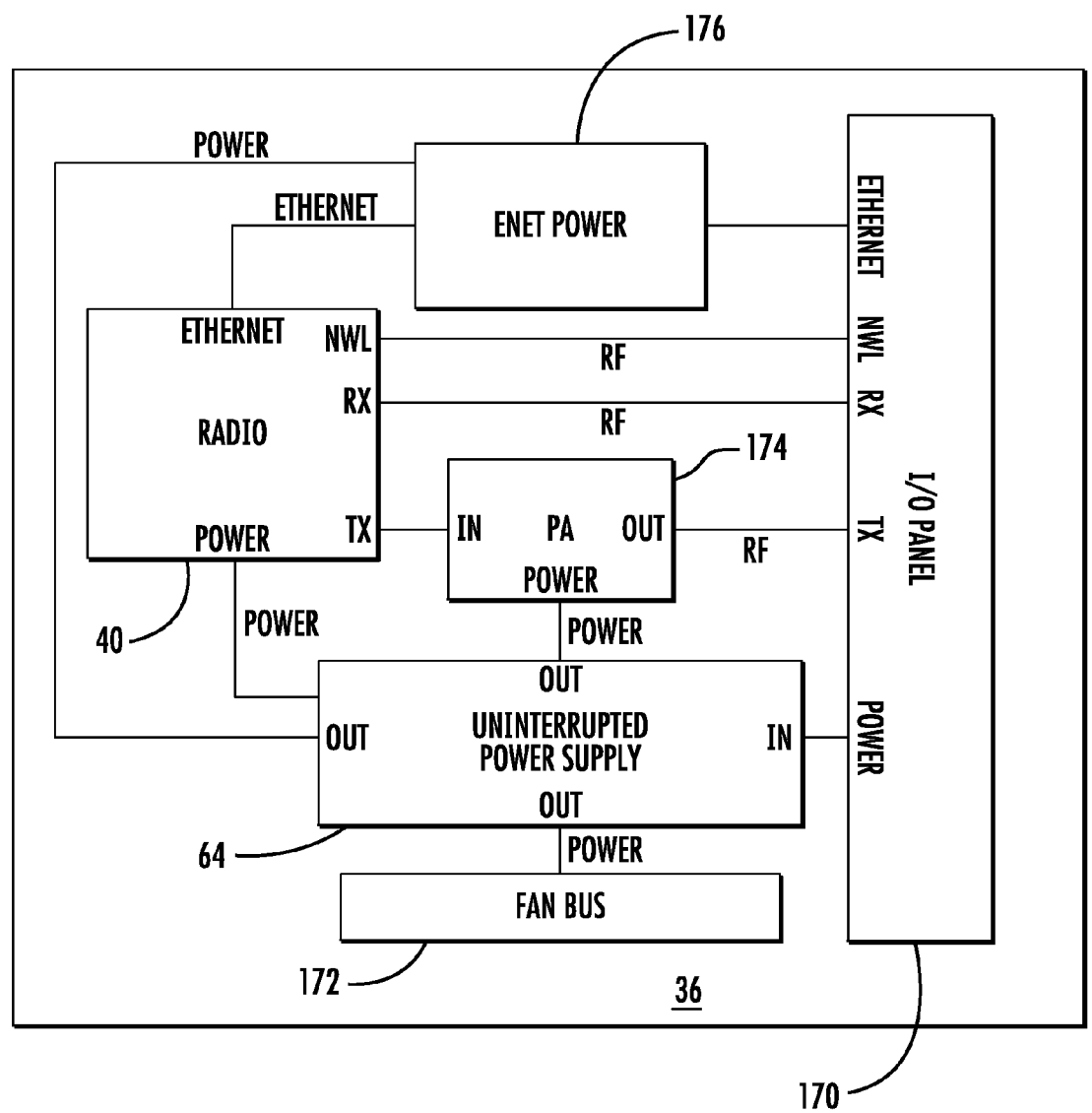
FIG. 9 is a block diagram of a portion of the components forming the management access controller in accordance with a non-limiting example.

A block diagram is shown in FIG. 9 of an example tray layout of the main server and radio rack 36 and picocell radio 40 and with a 19-inch rack and mountable trays as part of the management access server 12 and is shown in FIG. 9. As illustrated, the uninterrupted power supply (UPS) 64 connects to an input/output panel 170 and a fan bus 172 to operate various fans and maintain cooling for the server 12. The power supply 64 also interconnects to a power amplifier 174 that powers the various radios 40. Ethernet power 176 is also provided via the input/output panel 170 and to radios 40. Each tray may also include power, fans, and status LED's and may also include RF duplexer, filters or amplifiers as necessary.

Figure 10:
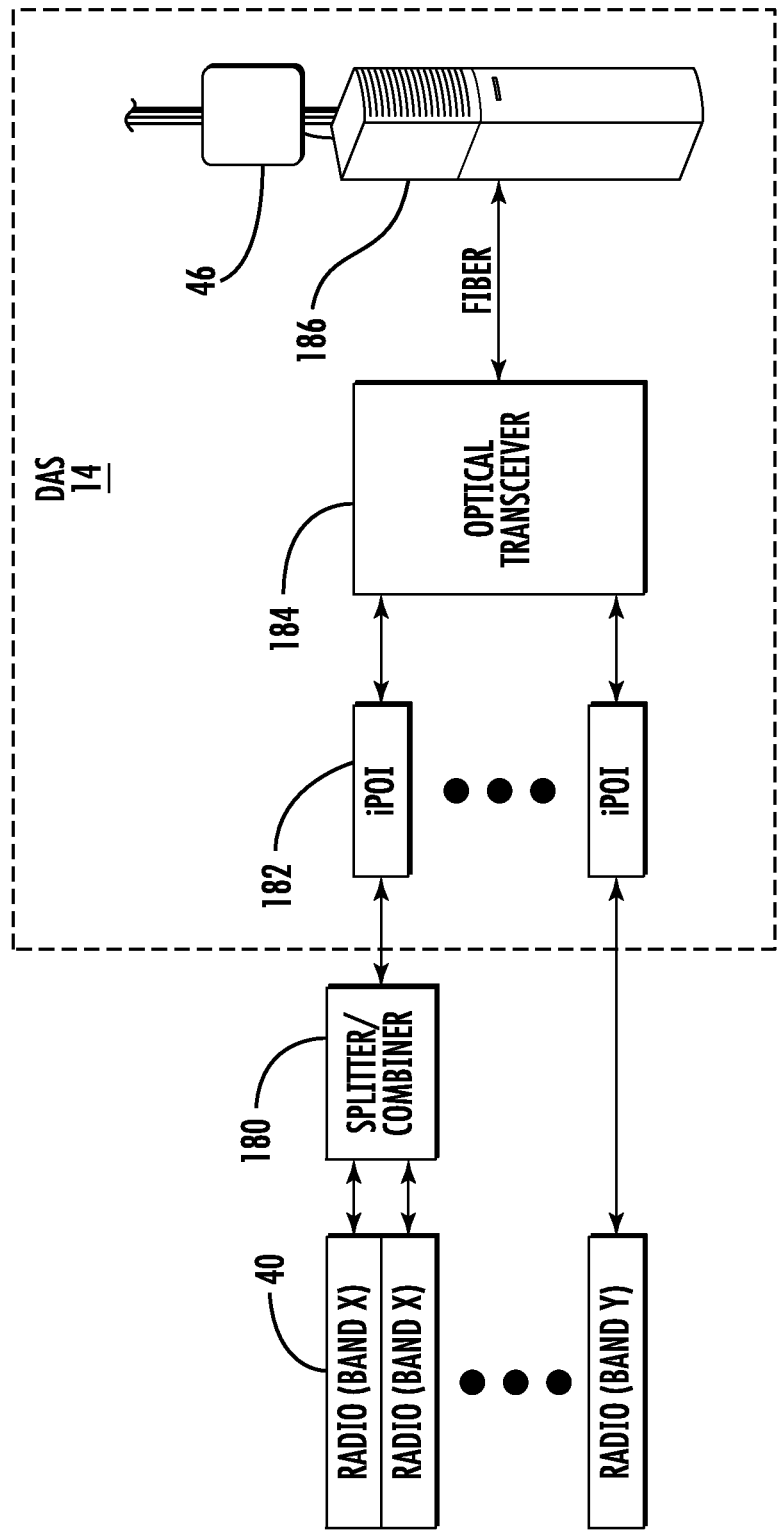
FIG. 10 is a block diagram of components that cooperate with a directional antenna in accordance with a non-limiting example.

FIG. 10 is a block diagram of the distributed antenna system 14 connected to different radios 40 that operate at multiple bands illustrated generally as Bands X and Y, each connected to a splitter/combiner 180 and an intelligent point-of-interface 182 where one per band is provided per interface. This intelligent point-of-interface 182 provides RF leveling and is programmable. Each point-of-interface 182 is coupled to the optical transceiver 184 and by optical fiber into the remote unit 186, and thus, to a respective directional antenna 46.

A Managed Access Carrier Generator (MACG) may interoperate with the distributed antenna system 14 and is part of the management access server 12 and has multi-carrier transmitter functionality for wireless networks. It generates up to four independently tuned control channels in one of several wireless licensed bands. It is possible to modulate a PN sequence with multiple frequency bands with an RF power output of about 1 watt. It may include various interfaces, including four individual TNC connectors in one example on a back patch panel with a combined carrier single TNC preferred so long as it is individually power controlled. The network may be 10/100 Ethernet TCP/IP with a standard RJ45 on the back panel and use SNMP.

Generated messages may include bit, active channels, temperature, frequency tuning, output power adjustment per channel, channel on or off, soft reset and hard reset. The state of health reports and events may be generated via SNMP messaging with a time sensitive active, temperature, power, radio fault, and VSWR alarm. The distributed antenna system 14 shown in FIG. 2A provides the programmable interfaces for the radio signals and multiple remote units and directional antennas 46 that sculpt the RF coverage for the RF "bubble" 150. As noted before, the goal is to set the RF power levels for each cellular downlink signal at the fence-line 156 (FIG. 5) to be ≤6 dB stronger inside the boundary and 3 dB or more weaker outside the boundary as illustrated. The zone of uncertainty 154 is generated due to the antenna pattern back lobes where the effect is amplified at higher antenna power towards the front lobes.

Referring now to FIG. 11, a network security diagram for the managed access system 10 shows various components that implement network security and operate to isolate equipment and prevent malicious intrusions and system degradation. The management access server 12 interoperates via a switch 202 to the uninterrupted power supply (UPS) 64 and its various PDU outlets 204. A physical security device 206 interoperates with a camera 210, smoke detector 212, water sensor 214, humidity sensor 216, temperature sensor 218 and door sensor 220 as also described above. The switch 202 also interoperates with the DAS master server 48 and a DAS uninterrupted power supply (UPS) 210 and the remote units 186 and DAS directional antennas 46. The radios 40 form a radio array in the main server and radio rack 36 and are interconnected via the switch 202 to other internal components of the management access server 12 and outward through the firewall 54 to the event database 34 where events are recorded with local status and control via the remote operator 162 also shown in FIG. 6. From the firewall 54, a connection is made to an internet service provider point of presence 230 and then to the internet 232. The internet connection can be made to a remote firewall 234 for remote status control with various gateways 236, switches 238, and controllers 240 to allow status and control from a remote location. The Internet connection can also be via a third party Session Initiation Protocol (SIP) server 242 and to the Public Switched Telephone Network (PSTN) 244.

Using this network security design shown in FIG. 11, the graphical user interface 30 may be used to provide entry of user credentials, including a user name, password and operator role. This may include in a corrections facility example the correction officer's station, device authorizer, contract or maintenance user, and operations administrator. A display screen may be provided for each role based profile. A corrections officer operator station 162, such as at the network operating center 160 (FIG. 6), will have the appropriate screen and user interfaces operating 24/7 without a timeout. The graphical user interface 30 allows the corrections officer to monitor RF transmissions, view estimated device locations, and estimate the types of signal emissions. Because a corrections officer may not have an authorized access or clearance, and because of federal or state regulations, it is possible that no specific data on device identification may be provided in some examples. The corrections officer should be able to observe health monitoring alerts that would be stored and listed in the event log database 34 (FIG. 1) and allow the correctional staff to respond further. An administrator user role will allow a user to view all data available to the corrections officer stations, but also acknowledge and clear alarms, define and run reports, and authorize system users. A device authorizer user will perform the tasks of the operations administrator and authorize devices for use within the facility, including cellular and other mobile wireless devices and traditional RF radio frequency devices. These devices possibly may not report as unauthorized events for a corrections officer station. The contractor that built the system 10 will have access, and any contracts manager will have access.

As noted before with reference to FIGS. 1 and 2, the cellular monitoring 16 of the system 10 will monitor the cellular environment and notify the managed access server 12 of any significant change to the RF "bubble" 150. It also will aid in establishing a base station survey of the commercial carrier network 45 to implement the distributed antenna system 14.

An example monitoring device as a remote cellular scanner 88 is a fixed autonomous telecommunications measuring receiver such as manufactured and sold by Gladiator Forensics under the tradename Gladiator 6700. One or more devices may be positioned at the facility 44 in a central or other location at the fence line or other areas. This monitoring device 88 provides layer 3 data for primary bands and technologies except IDEN and WiMax, in an example, although it is possible to provide a monitoring device to also scan IDEN and WiMax. The device or scanner 88 operates at 0-55° C. and uses minimal power. It uses a 9-34 volt DC input and a control connection via USB or WiFi. It is a small package of about 3×6×9 inches in one example. It can be operated manually with single button operation and autonomously scans and measures 2G, 3G, and 4G wireless networks and supports GSM, UMTS, LTE (TDD and FDD), CDMA, and EVDO. Most bands are supported in the frequency range of about 447 MHz to 3.8 GHz with pre-selection up to 8 bands. It includes MIMO downlink characterization. It has a nominal operating power consumption of 40 watts and is small and lightweight at 7 kg and ruggedized to an environmental specification of class 2 vibration and shock. Downconverted RF to IF signals are pre-filtered and passed to a signal processor where the data is collected and processed and sent to the drive application for analysis. It should be understood that other types of monitoring devices may also be used.

Changes to the commercial cellular network 45 may have a significant impact on the performance of the managed access system 10 and/or size and shape of the coverage area, i.e., the RF "bubble" 150. The cellular network monitoring device 88 will examine any commercial carrier cellular network environment, looking for changes in its environment that will impact the performance or coverage area of the managed access system 10. The monitoring system 16 supports most frequency bands and cellular technologies currently in use within the United States, including TD-LTE, LTE-FDD, UMTS, CDMA, 1×RTT, CDMA, EVDO, and GSN.

The monitoring system 16 also regularly surveys the cellular environment at the facility 44 and the results of these surveys are compared to the previously established baseline for that site. A comparison will detect configuration changes to any commercial carrier signals, including changes in transmitted power, alteration of configuration parameters, and changed or any new frequencies, channels or bands that are deployed in the area. Regular monitoring is important because changes to the commercial cellular network 45 will have an impact on the effectiveness of the managed access system's ability to prevent contraband or unauthorized mobile wireless devices from accessing the commercial voice and data networks. This task can be performed daily at the facility 44. Thus, the system 10 is able to mitigate changes in the commercial cellular footprint. The state of health monitoring 22 and system and configuration management 24 (FIG. 1) may operate 24/7 and the system 10 may generate weekly reports for status and activity updates and periodic updates for changes in cellular environmental changes that are discovered to the external network configurations in the commercial network 45. The table below illustrates non-limiting examples of different monitored features for the system 10.

| | |
|---|---|
| Cellular Baseline System | Weekly Reports |
| | System Health Verification |
| | Blocked Call Detail Record |
| | User ID Report |
| | Audit Log Reports |
| | Authorized Number Alert Report |
| | Authorized Number Reports |
| | Authorized Number Expiration Reports |
| | Cellular Environment Current Status (Threat Assessment) |
| | State of Health Alerts |
| | Over-temperature Alert |
| | Tamper Alert - Rack |
| | Off-line System Components |
| Internal Localization Sensor Array | Weekly Reports |
| | System Health Verification |
| | Cellular/WiFi Event Localization Report |

When a commercial carrier change in the commercial communications network 45 indicates a change is required to the software configuration for the managed access system 10, a file may be pushed electronically to the management access server 12 at the facility 44. Any software upgrades or updates can be coordinated with a designated facility officer or at the network operations center 160 to ensure any potential system operation disruption is coordinated and minimized. Once the update is applied, a repeat survey can be completed to ensure that the event risk has been mitigated and the issue resolved.

If a change in commercial carrier 45 dictates a hardware configuration change in the system 10, the system builder may coordinate with a designated facility office to schedule a site visit and make the prescribed changes. An example could be when the change in cellular coverage indicates an alignment of one or more directional antennas 46 is required or an adjustment should be made to improve signal delivery and compensate for an increased commercial carrier signal level. If a change also indicates a new or additional hardware upgrade is necessary to maintain system performance effectiveness, such as when a new commercial carrier has added coverage to the area, the system builder may develop a proposal for necessary changes and add or upgrade equipment.

Figure 12:
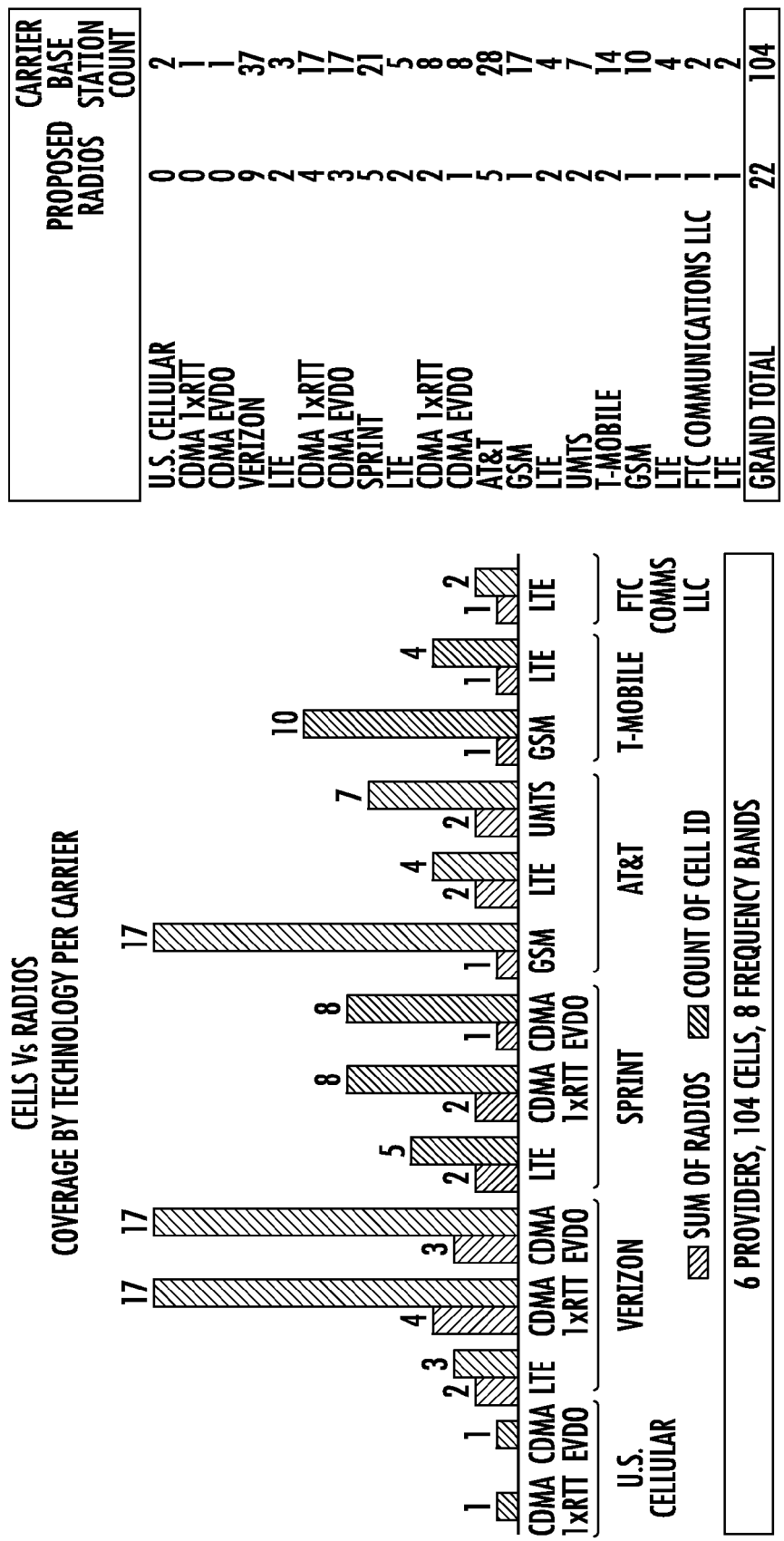
FIG. 12 is a bar chart of an example preliminary cellular design site study showing coverage by technology per carrier to implement a distributed antenna system in accordance with a non-limiting example.
Figure 13:
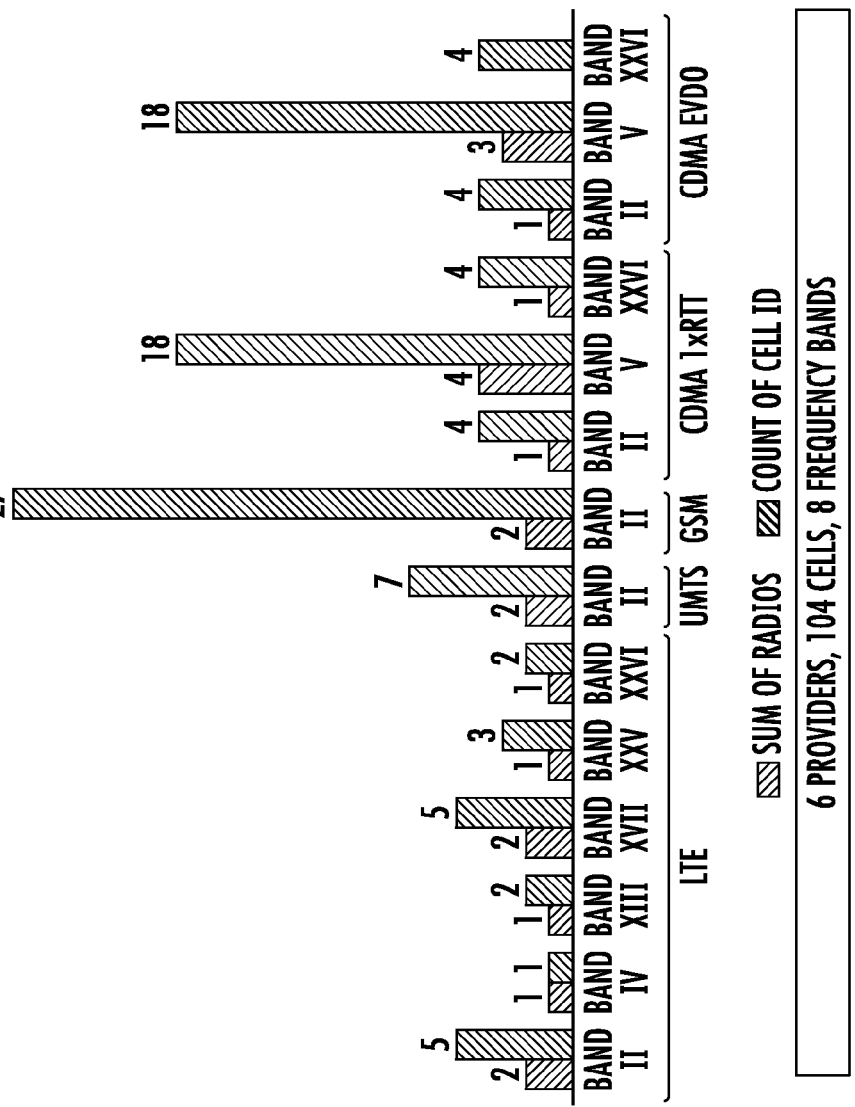
FIG. 13 is a bar chart similar to that shown in FIG. 12, but showing the results of coverage by technology per band in accordance with a non-limiting example.

As noted before, the monitoring device 88 initially determines the existing commercial coverage site baseline using a cellular site survey. For example, FIGS. 12 and 13 are bar charts showing an example of the measurements in a local cellular environment in one non-limiting example that is assumed for a facility deployment. FIG. 12 compares the local coverage to an assumed base station radio selection by technology, per carrier, and FIG. 13 compares the local coverage to an assumed base station radio selection by frequency band, per technology. FIG. 14 is a table summarizing the base station technology mix that has been assumed at that facility.

Figure 15:
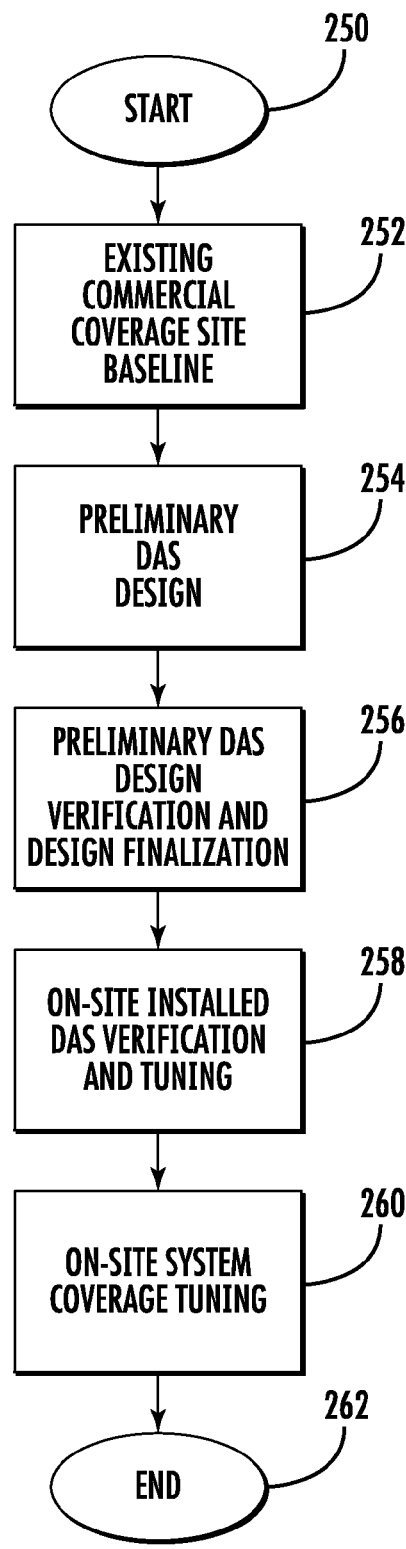
FIG. 15 is a flowchart showing an example method for implementing the distributed antenna system in accordance with a non-limiting example.

FIG. 15 is a flowchart showing an example of the steps for designing and constructing the distributed antenna system 14. The process starts (block 250) and the existing commercial network 45 coverage site baseline is established (block 252). This may encompass a drive survey around the facility 44 to determine the technologies, frequency bands, channels and predicted coverage for the facility 44. The strongest serving cell plots for each carrier for each technology and frequency are established in the cell survey to form the coverage site baseline.

A preliminary distributed antenna system 14 design is implemented (block 254) and the location, height and directional antenna 46 type are determined based upon the site baseline and the system 10 signal coverage zones established throughout the facility 44. The signal coverage boundary at the facility 44 for the fence and property lines 152, 156 are also calculated. A preliminary distributed antenna system 14 configuration is established.

The preliminary distributed antenna system 14 design is verified and finalized (block 256), followed by an on-site installation with verification and tuning of directional antennas (block 258) and on-site system coverage tuning (block 260). The process ends (block 262).

Figure 16:
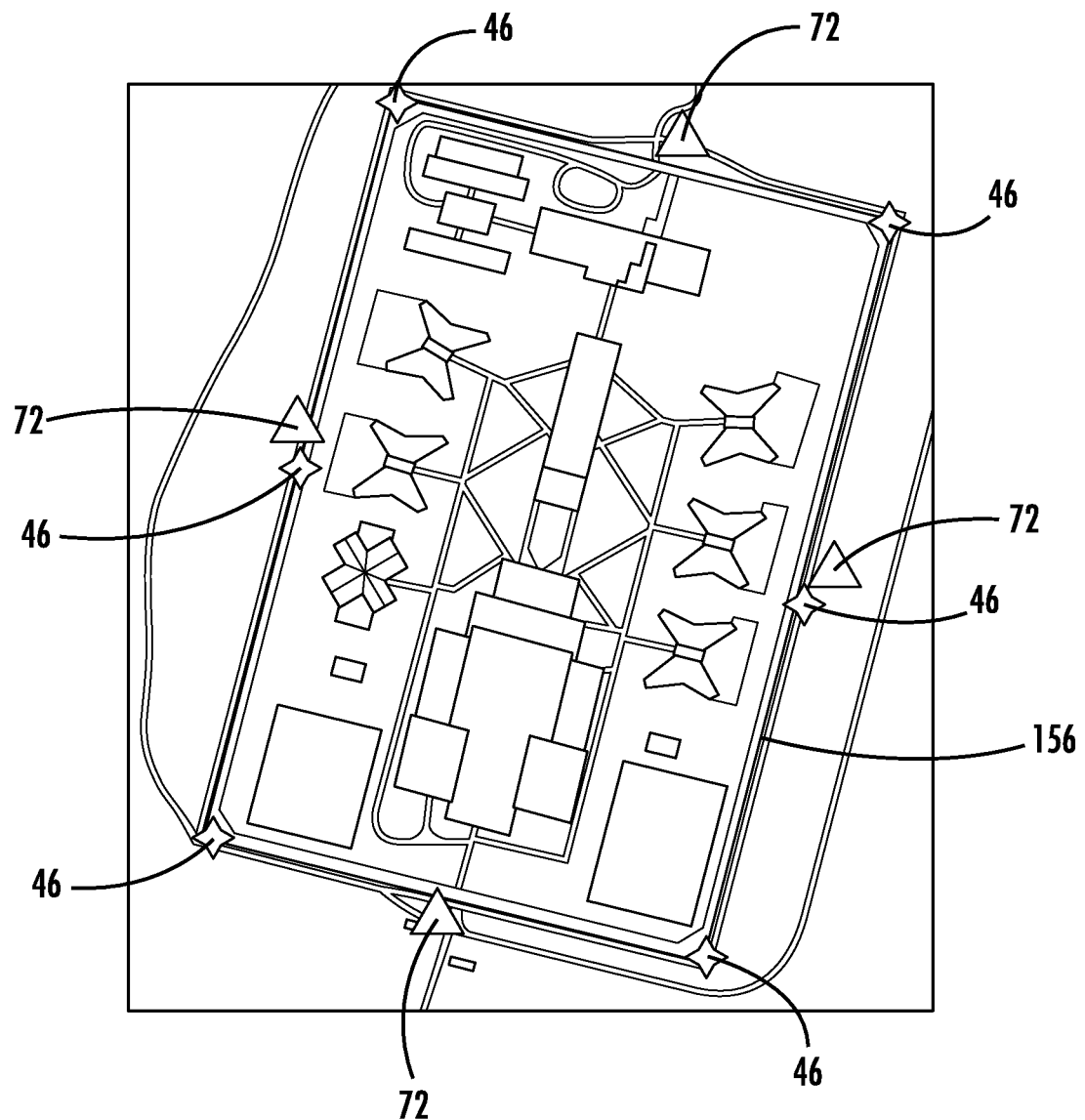
FIG. 16 is a plan view of the facility showing positions of external geolocation devices in accordance with a non-limiting example.

An example of an external geolocation device or sensor 72 that forms the external geolocation sensor array 70 around the periphery of the facility 44 is an array of sensor devices such as the RFeye array sensor manufactured and sold by CRFS as the RFeye series of sensor devices. These external geolocation devices 72 are arranged around the periphery of the facility such as shown in FIG. 16 and may provide a "heat map" with course granularity sensing of RF radiators, such as cellular or other mobile wireless devices, including non-cellular devices, that energize on the premises. This heat map may be generated from time difference of arrive (TDOA), power on arrival (POA), and angle of arrival (AOA) signals. This sensor array 70 may also locate rogue signals autonomously and report them to the management access server 12. Each sensor 72 may include a dynamic and programmable RF filter mask with logging of signals and mapping of signals on the graphical user interface 30 to depict a floor plan at the facility and show the relative location of selected signals.

Figure 17:
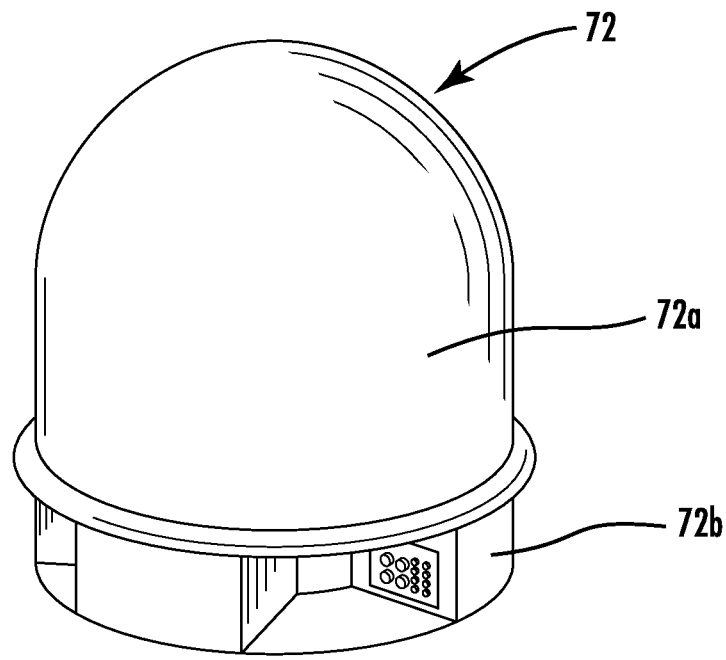
FIG. 17 is an example of an external geolocation device in accordance with a non-limiting example.
Figure 18:
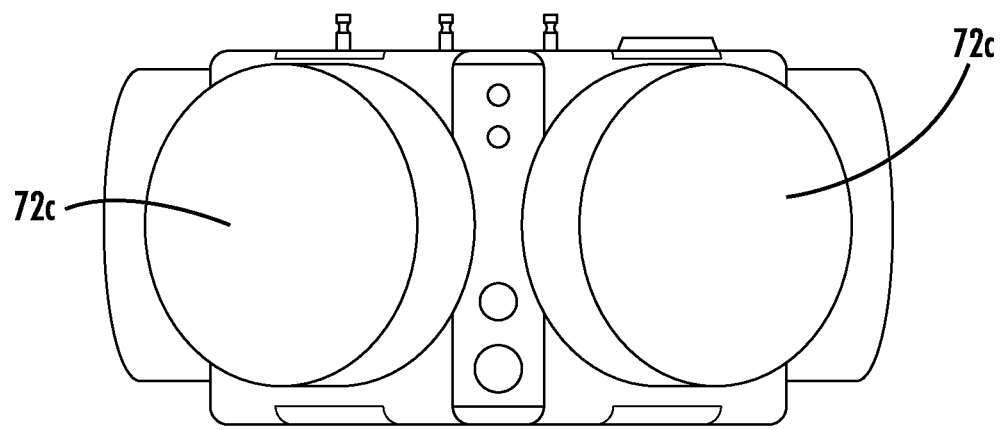
FIG. 18 is an example of the spiral antennas used in the external geolocation device in accordance with a non-limiting example.

Referring to FIG. 16, the facility 44 shows six directional antenna 46 locations indicated by the stars. The triangles depict four locations for external geolocation devices 72 forming the external sensor array 70 with devices 72 located at the central sections of the rectangle formed at the fence line 156. The poles supporting the directional antennae 46 at the mid-section could also support an external geolocation device 72 in a non-limiting example. FIG. 17 shows an example of the wideband remote sensor device 72 with a semi-hemispherical outer housing 72a and support base 72b. FIG. 18 shows the outer housing 72a removed and showing spiral directional antenna modules 72c that are arranged at an angle to each other, and in this example, about 60-90° from each other. This external geolocation sensor array 70 may be formed from remote sensor devices 72 that are available in different sizes and antenna configurations and have frequencies ranging from 20 MHz to 18 GHz. The sensor devices 72 use twin receiver channels to provide simultaneous monitoring, directional finding (DF), and geolocation capabilities. The spiral directional antenna modules 72c may be optimized for different frequency bands and arranged in multiple orientations. These antennae are sensitive to incoming signal polarizations, including all linear polarizations. These sensor devices 72 allow an angle of arrival bearing based on the received power to each antenna and may be overlaid on a user interface 30 as maps, satellite images and 2D/3D GIS data sets to give a positional display and geolocation probabilities for a mobile wireless device 42 in the facility.

With angle of arrival sensing, the devices 72 rapidly switch between the directional antenna modules 72c and respond directly to the received RF power. Thus, they are effective with most types of RF transmission. Using angle of arrival, three receiver points ensure geolocation to a small area, even when the target is colinear with two receivers. Results may be limited by the noise floor of the receiver.

With time difference of arrival, the devices 72 use synchronous time domain to determine the relative time of arrival of a signal at different receiver locations. Two monitoring receiver points provide geolocation probability in two dimensions along a hyperbolic curve, while three receiver points provide geolocation probability to a bounded area or point. An advantage is that the processing gain of correlations permits successful geolocation of signals close to or even below the receiver noise floor. Power on arrival uses synchronous frequency domain and is beneficial for those mobile wireless devices 46 that are close to or among different buildings where amplitude comparison will yield sufficient differences. It uses three or more monitoring receiver points.

An internal location sensor array 80 is formed from internal geolocation devices as internal sensors 82 and are arranged within the periphery of the facility. In addition to adding the ability to localize a cellular or other mobile wireless device 42 in and around the buildings on facility grounds, the internal sensor array 80 provides the added capability to detect and estimate the location of WiFi devices in and around the various buildings of the facility 44.

An example internal geolocation sensor 82 is a location-based WiFi and cellular detection and monitoring device manufactured and sold by AirPatrol under the tradename ZoneAware, as a precision location-based services platform. These sensors 82 may interoperate with a ZoneEngine application programming interface, also manufactured and sold by AirPatrol. The sensor 82 location is accurate to within 6 to 50 feet depending on the type of device and their spacing. The sensors 82 may incorporate positioning capabilities using beacons and a Bluetooth standard known as "Bluetooth Low Energy" (BLE) to broadcast messages to other devices within a small tunable radius around the beacon. In one non-limiting example, sensors 82 may be located approximately 65 feet apart with different sensors located on different floors and linked in a mesh network via WiFi or connected via wired Ethernet or Power over Ethernet. The sensors 82 are deployed throughout buildings in the facility, usually on the exterior of the buildings, and at a higher elevation for enhanced security to prevent tampering.

Figure 19:
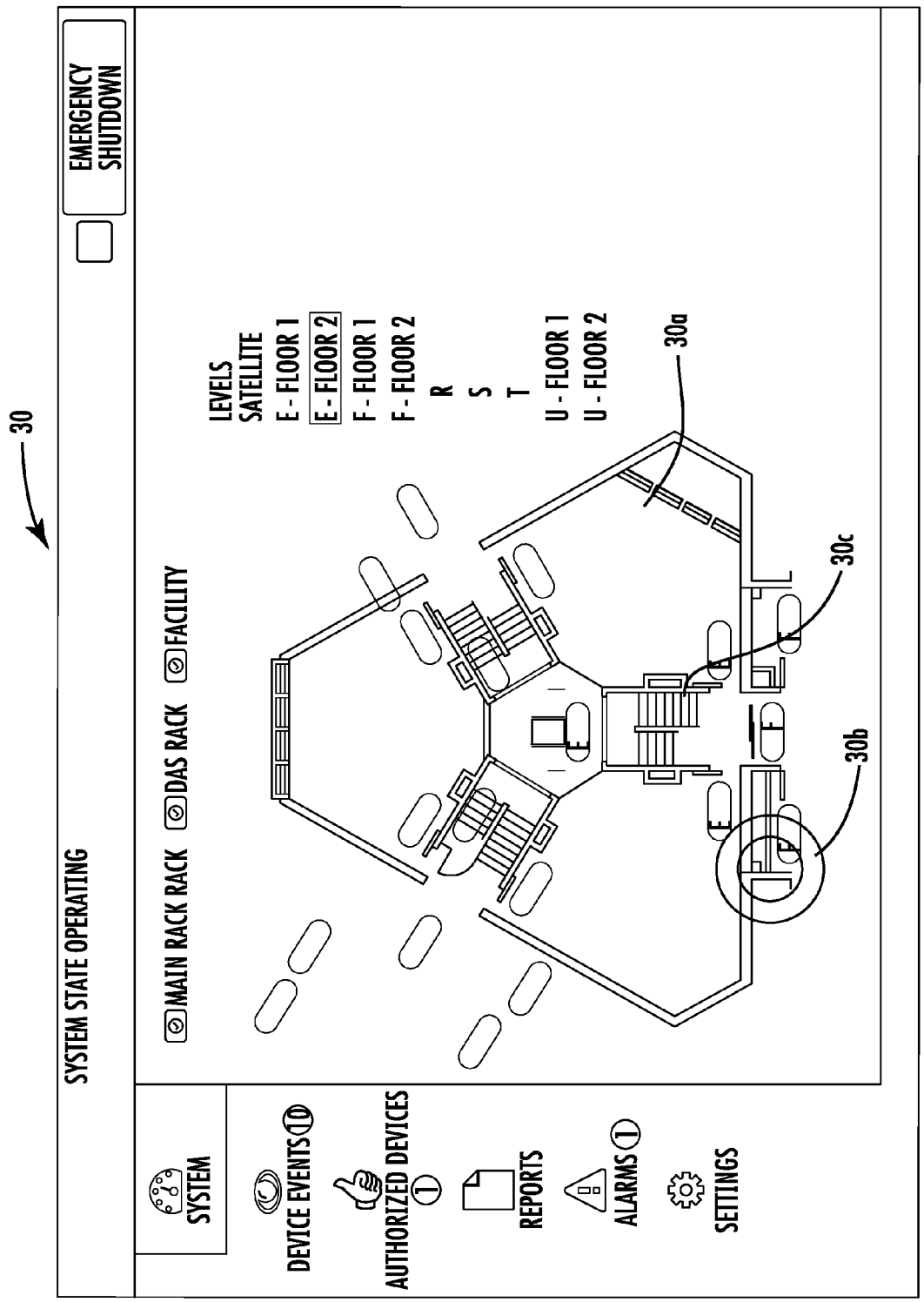
FIG. 19 is an example screen shot of the graphical user interface for the managed access system and showing a located mobile wireless device in accordance with a non-limiting example.

The detection of cellular signals using the managed access system 10 is a layered or tiered approach and focuses on determining which internal or external geolocation sensor 72, 82 detected the signal and at what level the signal was detected. An indication or alert can be placed on the user interface 30 to indicate the sensor or sensors that identified the signal transmission and at what power level. This alert will provide a general location where the mobile wireless devices 42 are located, such as shown in the example of FIG. 19, which illustrates the user interface 30, for example, at an operator's screen at the network operations center 160. This user interface 30 shows an example building 30*a* at the facility and the alert 30*b* on the floor for the mobile wireless device at an area near the stairwell 30*c*.

Detection and accuracy of the localization functionality are dependent on the ability of the sensor 82 to: (1) receive a signal at a sufficient level (often –100 dBm or greater); (2) the construction of the facility being protected; and (3) the placement separation of the sensors themselves. An example placement for sensors 82 is shown in the facility 44 of FIG. 20. In this non-limiting example of a correctional facility, many sensors 82 are positioned on the exterior of buildings, indicated at 82*a*, where they will not be reached easily and removed and can be readily observed by security. A few sensors indicated at 82*b* are located inside some of the larger buildings, for example, which may have upper floors or internally secure areas.

Figure 20:
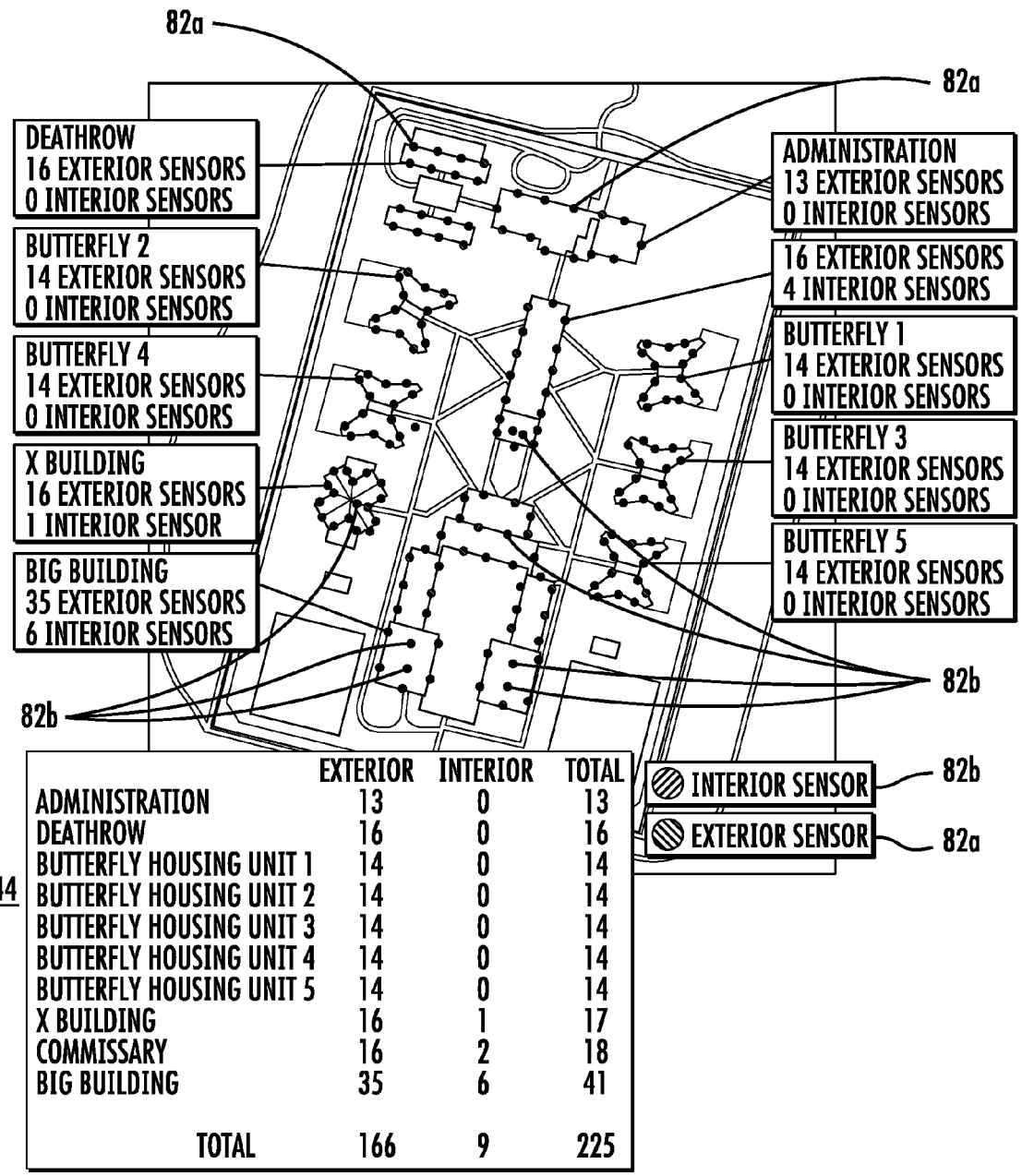
FIG. 20 is a plan view of the facility showing location of internal geolocation devices in accordance with a non-limiting example.

In the example of FIG. 20, the accuracy of a sensor 82 is equal to about twice the radius of a sensor separation distance. This will vary depending on the building type and the actual accuracy measurements would be determined based upon a completion of the site survey and design analysis. Usually mobile wireless devices 42 would be detected and marked with the resolution of about 50 meters. This is a layered approach to detection and disrupting unauthorized calls. If a facility desires a higher degree of accuracy, this can be accomplished by increasing the number of sensors 82, resulting in enhanced accuracy to within five meters. This enhanced accuracy will increase the cost of any facility installation, however.

The managed access system 10 prohibits cellular and other mobile wireless devices within the protected facility 44 from accessing commercial voice and data networks by attracting and providing service to those devices within the facility. The system 10 interacts with each device using industry standard messaging traffic and these device interactions can be used to generate event records within the system 10 that identify specific information. The system 10 may process each event with a time/date stamp, the type of event (registration, voice call, text message and other details of the event), along with any electronic hardware identifier (IMEI/ESN/MEID) that is associated with the event, including carrier account identifiers (IMSI, MIN), and the dialed number if applicable. The system 10 may store each event record in the local database such as the event log database 34. The system provides a flexible routing capability that allows the system 10 to route unauthorized device voice call and data access attempts. For example, voice calls could be routed to a standard or custom pre-recorded announcement or to a voice mailbox or even local dialed extension.

Further information could be verified as to the caller to allow the call to be connected or disabled. Data access attempts can be routed to a standard or customized website maintained locally within the facility 44 or can be configured to send traffic to a predefined address on the outside commercial communications network 45. Authorized users are allowed to access outside voice and data networks so their devices can make outside voice calls, send texts, and access content on the Internet. This may be authorized by several techniques through the managed access system 10 such as redirecting authorized devices to the commercial communications network 45 and allow them to access the outside voice and data networks. This approach allows an authorized mobile wireless device 42 access to all services provided by their home commercial carrier. Another approach allows all authorized calls through the existing inmate telephone system (ITS), but this approach has privacy concerns for authorized device users.

A preferred technique is to provide voice conductivity through a third party SIP server 242 (FIG. 11) and route text and data accesses directly to the Internet 232 through a gateway connection. This would allow the managed access server 12 to provide conductivity to any authorized devices and route the voice and data traffic to the Internet 232 and to the appropriate off-site service connection point. Up to forty authorized users may be used in an example and even more authorized users depending on the equipment and set-up. The managed access system 10 will permit 911 calls from any device whether authorized or not and calls can be directed to the appropriate local emergency services agency or facility security office using the voice-over-IP (VoIP) connection through the SIP server 242, for example. Emergency 911 calls can result in an alert to the organization's security office that the call was initiated by a mobile wireless device 42 within the facility 44. In the event of a 911 call by a mobile wireless device 42 connected to the managed access system 10, a local emergency Public Safety Answer Point (PSAP) may be the answering location and the proposed baseline implementation routes the call through the locally hosted SIP server 242 for conductivity. This will result in a call appearing to be calling from a land-line phone within the facility.

As noted before, each call interaction with a mobile wireless device 42 connected to the managed access system 10 generates an event record within the system 10 that includes the time/date stamp, the type of event such as the registration, voice call, text message and other details along with the hardware identifier and any carrier account identifier that was associated with the event. The system 10 stores each event record in the event log database 34 such as shown in FIG. 1. Because each of the attempted calls is stored as a unique event record, the system 10 may compare the data to search for the use of multiple SIM (Subscriber Identity Module) cards by a single hardware device or the occurrence of a single SIM in multiple hardware devices. This information may be automatically flagged and the device blacklisted from use and placed on an investigative user interface screen for quick reference such as shown in the user interface 30 screen in FIG. 21. In the indicia, the thumbs down corresponds to an unauthorized device and the thumbs up to an authorized device. The device with the swapped SIM card may be color coded differently. Other device details are included as illustrated, including device identifiers, type of calls such as voice or SMS, and other details.

As noted before, different reports may be generated with the aid of the user interface 30, such as the example screen shots in FIG. 22 showing an authorized device with the thumbs up designation and unauthorized devices with the thumbs down designation. Further details of those devices can be determined by clicking on appropriate tabs. The graphical user interface may include information such as the time of the event, e.g., call or SMS text, device identifier, and even number dialed.

The system 10 may also operate in a passive or active mode. In the passive mode, the system 10 allows a mobile wireless device 42 within the coverage area formed by the RF bubble 150 to interact with the system, but does not disrupt access to the commercial communications network 45. It may be used during system verification prior to "going-live." Once the system 10 is tuned and adjusted, it can be switched over to operate in the active mode where the system attracts and holds cellular and other mobile wireless devices 42 within the facility coverage area. The system 10 prevents those devices from obtaining service from the commercial networks. In this mode, authorized mobile wireless devices 42 are allowed access to voice and data services, while unauthorized devices are not. The active mode would be the normal mode of operation for the system 10.

Because the system 10 has enterprise capability with connection to external communications of a commercial communications network 45, the system 10 is provisioned to log and report event data in customizable ways that make use easy for the operator. In this case, reports, system alerts, emails, and even text messages can be sent and displayed on the graphical user interface 30 when specific events occur. This may include:

1) Health Monitoring: Provides the ability to monitor and view the system health, including status and performance of all major components, equipment alarms, software issues, performance of the servers and web portals.

2) Report Generation: The system also provides the ability to monitor and generate reports on the system performance and threat assessments, create alert logs, audit trails, and long-term activity records. Time and date information are synchronized to the facility logs. Some of the standard reports and alerts are listed below.

Blocked Call Detail Record: Identifies all blocked cellular wireless calls and includes information about the facility from which the call was placed, i.e., date and time, originator's phone number, originator's cellular device hardware ID, and destination phone number (dialed digits). If the optional sensor array is installed, a location estimate is also provided.

User ID Report: Reflects the activity of user ID accounts created/activated during a specific reporting period. This report indicates the name and User ID of the device user that created/activated the account with the date and time stamp, the user account(s) created/activated, the date the profile was deactivated, the last successful or attempted log-in, and all updates to the account.

User ID Alert: Notification of modifications to a device user account.

Audit Log: Provides the User ID, name, log-in date and time, activities (files accessed) for each session. The system also records and reports the user ID, name, time and date of failed attempts.

Authorized Number: Notifies the appropriate operator of the system 10 when a new mobile wireless device 42 has been added or devices have been deleted from the authorized cellular device list. Details the telephone numbers that have been identified as authorized to make calls within the facility. Includes the unique user identifier of the personnel that entered or modified the Authorized Number status as well as the dates of status changes to each number.

Authorized Number Expiration: Provides for authorized cellular wireless device or group of devices due to expire within 30 calendar days.

The system 10 is designed to self-monitor and report the system state of health in order to minimize the operational labor costs. Each functional component of the system 10 is monitored to ensure it is operating normally so the system operates at peak performance. The system 10 verifies communication links to provide a high reliability fault management approach. Any alarm or change in the operating conditions generates a system alert. All alerts are first acknowledged by the appropriate operator prior to the condition being either automatically or manually cleared.

As part of the state of health monitoring 22 (FIG. 1), the system 10 may provide a physical security feature such as the network security shown in FIG. 11 that detects physical intrusions or hardware tampering attempts, such as an unauthorized opening of an equipment rack. The physical security also provides the ability to monitor humidity, temperature, and other environmental conditions remotely. Alerts are generated to protect the system integrity from physical intrusion and environmental threats. Cameras 210 (FIG. 11), for example, are mounted to monitor the main system rack and are used to visually verify personnel prior to allowing physical access to hardware.

As noted before, the physical security includes the ability to control physical access to hardware and record and log physical access events. Built-in physical security includes an integrated camera 210 and environmental sensors, including temperature 218, humidity 216, airflow such as smoke 212, door 220, and audio and video recording (FIG. 11). By monitoring these parameters, the system 10 is able to ensure that the system state of health is protected from accidental environmental faults and ensure any attempts to alter the system maliciously can be recorded for corrective action.

Automated Health Monitoring includes status of the physical (hardware) elements of the system, performance monitoring and metric collection, fault detection and alarms. The status of each line replaceable unit (LRU) is tracked and reported independently, including damaged cables, antennas and sensors.

The system includes an uninterruptable power supply (UPS) 64 (FIGS. 2, 9 and 11) with sufficient levels of stored power to support the management access server 12 and the associated DAS master 48 for 30 minutes during interruptions to primary power to the facility 44. In the event that power is not promptly restored and the remaining power levels begin to reach a drained state, the system 10 may record an entry in the event log database 34 (FIG. 1) and implement a graceful shutdown to avoid damage. When power is restored, manual reactivation may result in the system restarting and resuming full operation.

In order to control costs, any remote LRU's may be connected to protected, back-up power, allowing their continued operation during temporary power outages. The system 10 is also designed to withstand the challenging environment of a correctional institution, if the system 10 is implemented in such a facility. As such, it is not anticipated to require frequent repair from routine damage of wear and tear. Should the system 10 be damaged from events such as lightning strikes, the system provider or installer may be automatically alerted to the event by the state of health monitoring 22 and the system 10 may generate an alert to notify an operator and system provider of the issue.

It is possible that the system 10 may identify and characterize rogue cellular towers using the various sensors and scanners 72, 82, 88, in accordance with a non-limiting example. An example is a rogue fempto cell tower, which is typically a small, low-power cellular base station and connects via broadband such as by DSL or cable to the network 45. Rogue fempto cell towers create threats to the managed access system 10 and will be identified and managed. Other towers may be a newly provisioned commercial service or covertly placed near and network connected. A fempto cell could also be a voice over IP (VoIP) WiFi cell tower or rogue cell tower. The various devices and sensors 72, 82, 88 may use a cellular protocol layer-3 information to identify the existence and location of a rogue cellular tower in near real-time. The sensors 72, 82, 88 identify the operating characteristics of the new and/or rogue cellular towers in sufficient detail to allow the site to be mitigated by the managed access system 10 or they may be investigated by others. It is advantageous over those techniques that authenticate tokens and blacklist, or use a baseband "man-in-the-middle" approach for mitigating threats.

Figure 23:
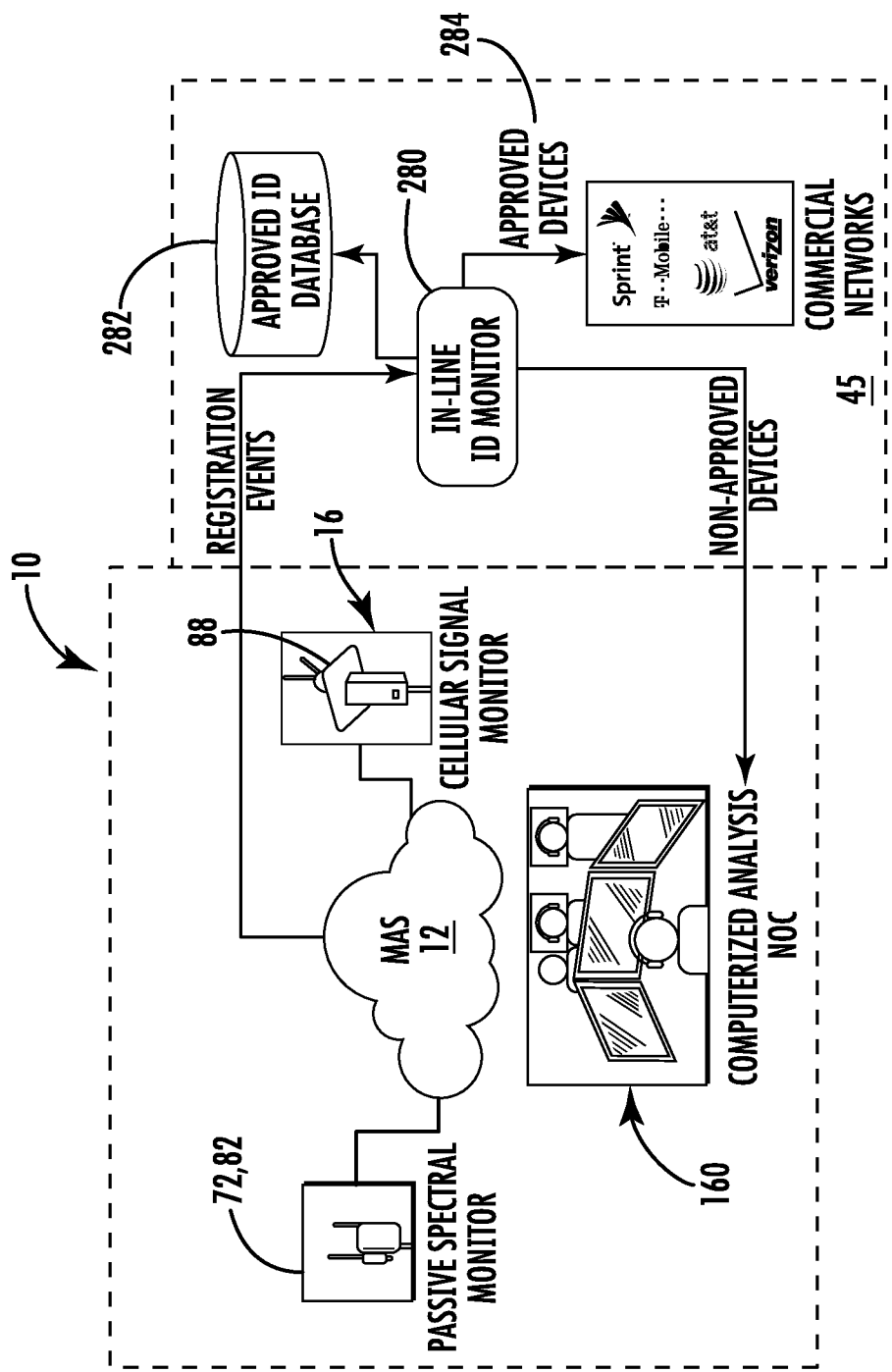
FIG. 23 is a fragmentary block diagram showing in-line monitoring for controlling communications with the management access controller in accordance with a non-limiting example.

Referring now to FIG. 23, it is also possible to provide a cellular in-line ID monitor 280 as a network interface device for access management. This in-line monitor 280 will provide device identification and filtering for controlled device access between a specific cellular base station and commercial networks. For example, the base station may be configured to induce a registration event as a localized LAC (Location Area Code) and the in-line ID monitor 280 may be installed on the S1-MME interface between the base station and the core network. The in-line ID monitor 280 will compare the IMSI (International Mobile Subscriber Identity) to a database 282 of approved IMSI ID's, allowing only approved devices to register with the commercial network 284. Any non-approved devices are connected to a local core network that is hosted within the system, allowing unauthorized devices to be managed within the system for assured security. FIG. 23 further shows the managed access system 10 and its management access server 12 and the monitoring function 16 with the monitoring device 88 and network operations control center 160. The passive scanning and signal geolocation is operable by internal and external sensors 72, 82. The in-line ID monitor 280 connects to an approved ID database 282 and approved devices 284 in the commercial communications network 35.

As noted before, the management access server 12 may filter communications between an unauthorized MWD and the network interface device as the in-line IDS monitor and pass communications between an authorized MWD and the network interface device. As noted before, the system is a tiered approach. Unauthorized devices may be held within a "holding pen" where no communications are allowed, and it is possible to deny portions of services and allow the devices to communicate with other authorized or unauthorized devices only in the facility. It is possible to limit outside communications to the device. It is possible to allow the devices to text an SMS message. It is also possible to allow the devices to send alerts and other messages. Thus, the management access server 12 may be configured to permit an unauthorized MWD to communicate with other MWD's at the facility whether unauthorized or authorized depending on how the system is established.

Figure 24:
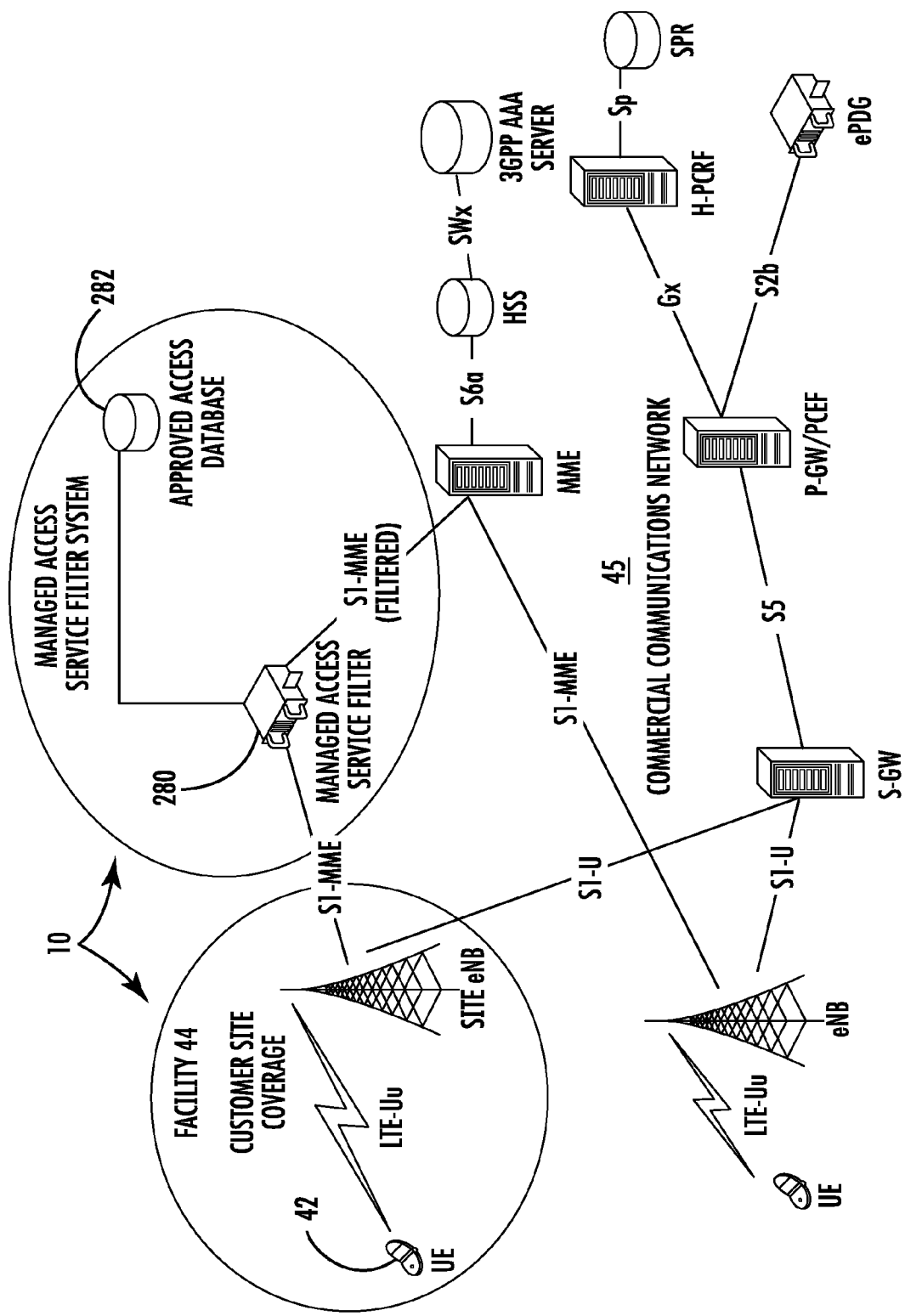
FIG. 24 is a network diagram similar to that of FIG. 23 and showing the in-line monitoring using a managed access filter for use with the managed access system in accordance with a non-limiting example.

FIG. 24 is another view similar to FIG. 23 and showing the commercial communications network 45 and further details of a MME server, HSS server, 3 GPPAAA server, and other components of the commercial communications network. The in-line monitor 280 forms the filter that is installed at the customer facility on the S1-MME interface between the local site eNodeB. It uses the database 282 of the approved IMSI ID's to allow known approved devices to register with the commercial communications network 45. Any non-approved mobile wireless devices 42 may be connected to a local core network that is hosted within the facility 44, allowing unauthorized mobile wireless devices to be managed within the system 10 for security. Thus, it is possible to provide an automated in-line ID monitoring for private cellular installations and control and identify authorized users for service connection.

Figure 25:
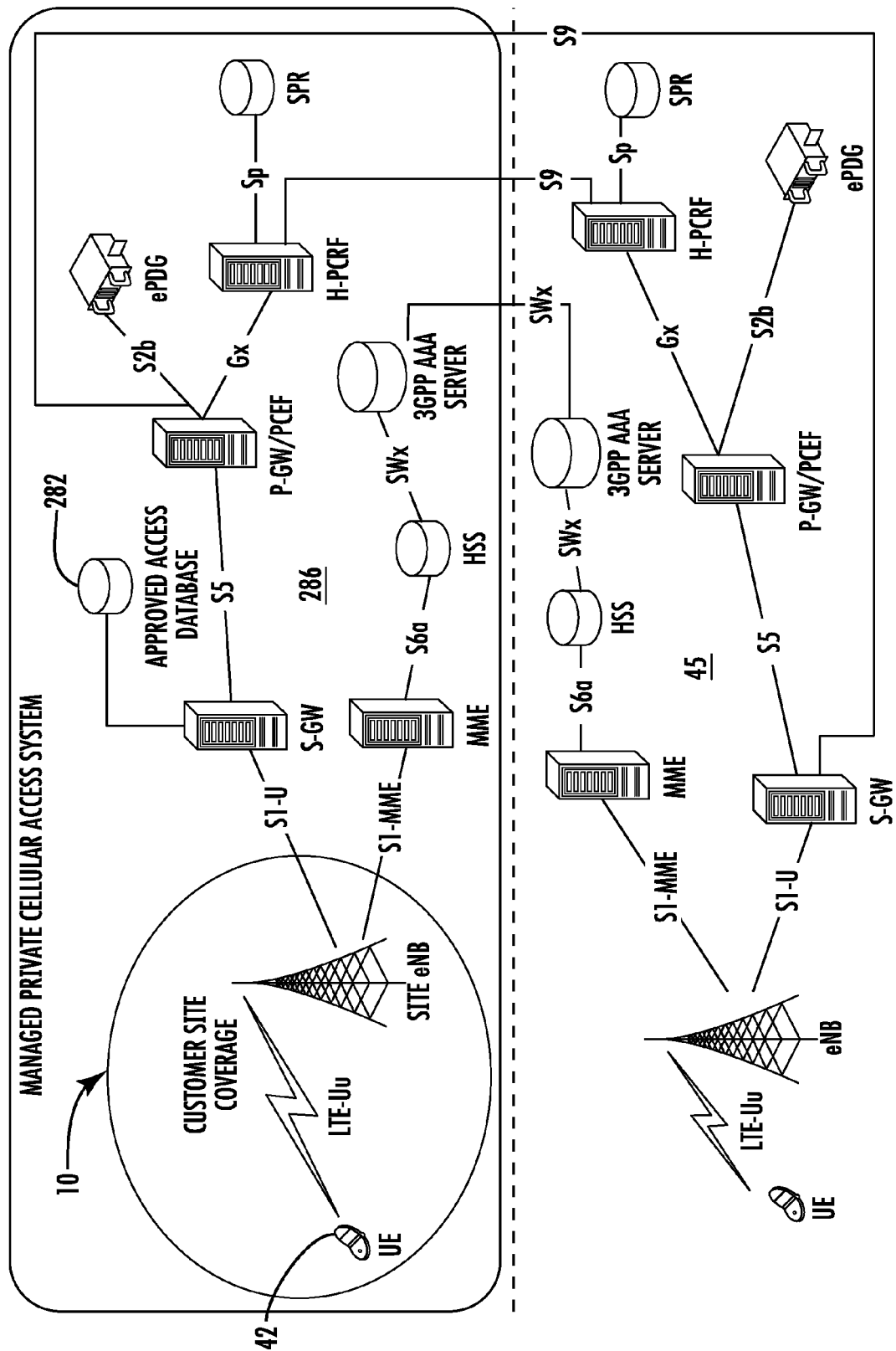
FIG. 25 is a network diagram showing a managed private cellular access system for use with the managed access system in accordance with a non-limiting example.

Referring now to FIG. 25, a managed private cellular access system 286 operates similar to a commercial service provider's offering service to all devices within the Customer Site Coverage area as the managed access system 10. That system 286 interfaces the commercial communications network 45 using standards based interfaces for roaming partnerships. Once any devices are registered, the system uses an authorized access database 282 to manage which devices are allowed access outside the system.

Figure 26:
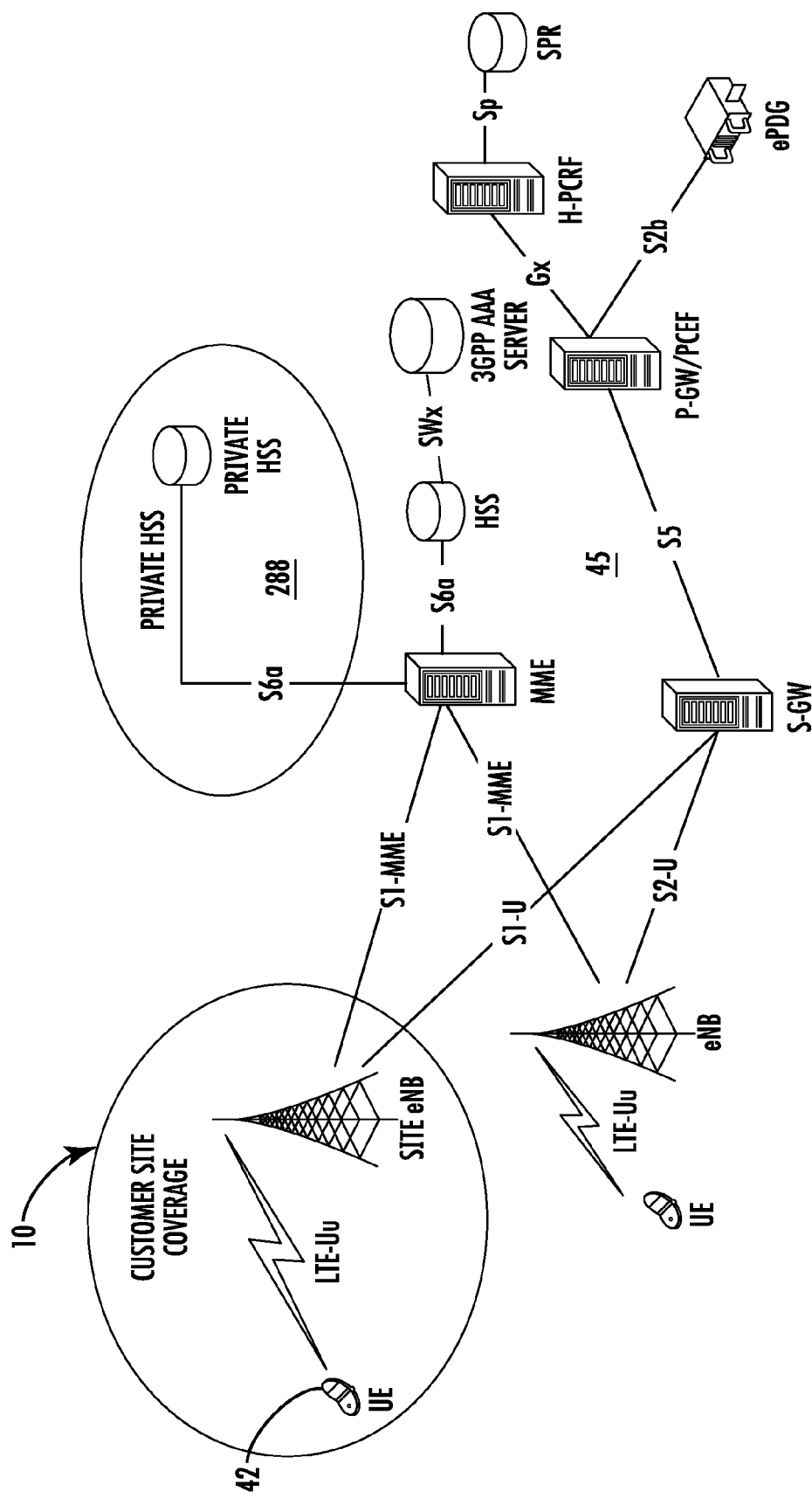
FIG. 26 is a network diagram showing a private Home Subscriber Server (HSS) for use with the managed access system in accordance with a non-limiting example.

FIG. 26 shows a private HSS 288 as a home subscriber server. Whenever a mobile wireless device 42 attempts to register on the site eNodeB installed at the customer site, the registration is routed to the private HSS 288 that is configured with the authorized set of devices as designated by the customer. Any unauthorized devices are not registered and the customer site coverage may induce a registration event, e.g., a localized LAC. The private HSS 288 may provide an ISMI and security credentials for the customer designated authorized devices.

Figure 27:
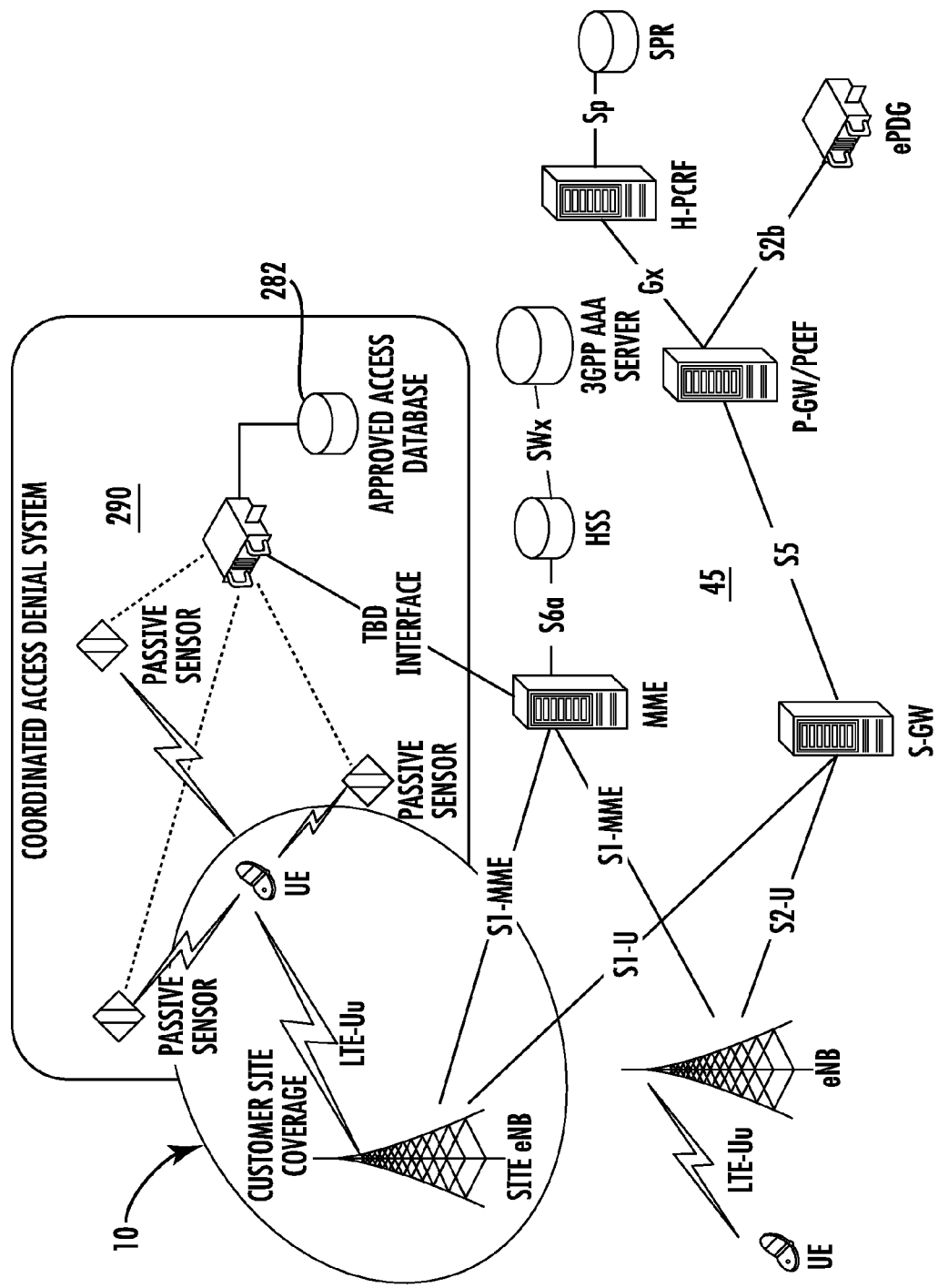
FIG. 27 is a network diagram showing a coordinated access denial system for use with the managed access system in accordance with a non-limiting example.

FIG. 27 illustrates a coordinated access denial system 290 that provides passive monitoring and a geolocation system that locates mobile devices operating within the customer facility. When a device that is not on the approved list is detected and positively located as being within the facility, the system 290 communicates with the commercial carrier network 45 so that the carrier does not provide service to that device. This may raise some issues of how to re-allow service to a device once it has been identified by the system.

As noted before, the site survey will be used to form a baseline of the existing commercial cell coverage, design distributed antenna system, verify the distributed antenna system 14, and finalize construction. As a non-limiting example, once the system is installed and operational and tuning of the distributed antenna system verified, a Site Acceptance Test (SAT) is completed, which ensures that operational coverage and functionality are acceptable for the facility 44. Table 1 below is an example of the tests and verifications that may be completed for final installation as a non-limiting example.

TABLE 1

Example of High Level Tests and Verification

| Step | Capability | Key Performance Metrics | Success Criteria | Determination Methodology | Notes: |
|---|---|---|---|---|---|
| 1 | Operation | System Detects Faulted Hardware | 100% | System running. Select any | A sample of random LRU's will be tested |

TABLE 1-continued

Example of High Level Tests and Verification

| Step | Capability | Key Performance Metrics | Success Criteria | Determination Methodology | Notes: |
|---|---|---|---|---|---|
| | | | | LRU and pull power, disconnect Ethernet connection, or remove optical connector. Detect fault | |
| 2 | Operation | System Detects Physical Alarms and reports event | 100% | System running. Apply a heater to the rack temp sensor. Verify notification and log. Repeat for other sensors | Temp, Water, Smoke, Humidity, Video, Door Ajar |
| 3 | Operation | System Allows Remote Software Upgrades | 100% | Remotely flash a new software load and verify new executable image loaded from a network login | |
| 4 | Operation | System Allows Remote Control and Status Monitoring | 100% | Verify GUI works from outside firewall | |
| 5 | Operation | System Provides Tiered User Access levels via System Sign-on Credentials | 100% | System Running, log in, determine access and lock outs | Repeat for each user class |
| 6 | Electronic Threats Detection | System Identifies contraband cellular phone in coverage area and reports | 95% | System running. At selected locations, turn on Harris provided test contraband cellular phones. Verify registration and event logs | Multiply by All: local technologies × Providers × Bands. Locations will be determined by applying a 10 wide × 10 long grid across coverage area and selecting test points within each grid sector |
| 7 | Electronic Threats Detection | System Provides Logs of detected device events | 100% | System running, invoke events, view logs | Multiply by All: local technologies × Providers × Bands. Locations will be determined by applying a 10 wide × 10 long grid across coverage area and selecting test points within each grid sector |

TABLE 1-continued

Example of High Level Tests and Verification

| Step | Capability | Key Performance Metrics | Success Criteria | Determination Methodology | Notes: |
|---|---|---|---|---|---|
| 8 | Electronic Threats Detection | System Provides Localization of User Equipment in Covered Area to within (If option implemented) | TBD meters | System running, invoke contraband cellular phone, view GUI report | Each protected building will be tested at evenly distributed test points. 10-points/building |
| 9 | Interdictions | System Interdicts contraband cellular phone voice calls and reports event | 95% | System running, turn on contraband cellular phone in coverage area, verify no service at cellular phone | Multiply by All: local technologies × Providers × Bands. Locations will be determined by applying a 10 wide × 10 long grid across coverage area and selecting test points within each grid sector |
| 10 | Interdictions | System Interdicts cellular phone Generated SMS Messages and reports event | 95% | System running, send SMS from contraband phone, verify no SMS sent | Multiply by All: local technologies × Providers × Bands. Locations will be determined by applying a 10 wide × 10 long grid across coverage area and selecting test points within each grid sector |
| 11 | Interdictions | System provides graphic representation of localized cellular phone on representative map of coverage area | 95% | System running, invoke contraband cellular phone, locate on site map | Multiply by All: local technologies × Providers × Bands. Locations will be determined by applying a 10 wide × 10 long grid across coverage area and selecting test points within each grid sector |
| 12 | Interdictions | System prevents incoming voice calls to contraband cellular phones in coverage area | 95% | System running, call a contraband cellular phone number hosted in covered area, verify no call completed | Multiply by All: local technologies × Providers × Bands. Locations will be determined by applying a 10 wide × 10 long grid across coverage area and selecting test points within each grid sector |

TABLE 1-continued

Example of High Level Tests and Verification

| Step | Capability | Key Performance Metrics | Success Criteria | Determination Methodology | Notes: |
|---|---|---|---|---|---|
| 13 | Interdictions | System prevents delivery of SMS messages to contraband cellular phones in coverage area | 95% within 1 hr | System running, SMS message powered contraband cellular phone in covered area from outside cellular phone, verify no SMS delivered over 1 hour | Multiply by All: local technologies × Providers × Bands. Locations will be determined by applying a 10 wide × 10 long grid across coverage area and selecting test points within each grid sector |
| 14 | Access management | System Provides cellular phone initiated Voice Service to authorized users and reports event | 95% | System running, turn on authorized cellular phone in coverage area, verify voice service at cellular phone | Multiply by All: local technologies × Providers × Bands. Locations will be determined by applying a 10 wide × 10 long grid across coverage area and selecting test points within each grid sector |
| 15 | Access management | System Provides 911 from any cellular phone in coverage area and forwards to specified cellular phone and reports event | 95% | System running, dial 911 from cellular phone in coverage area, verify rings through to specified cellular phone | Multiply by All: local technologies × Providers × Bands. Locations will be determined by applying a 10 wide × 10 long grid across coverage area and selecting test points within each grid sector |
| 16 | Access management | System facilitates delivery incoming SMS Service to authorized cellular phones and reports event | 95% | System running, SMS message powered authorized cellular phone in covered area, verify SMS delivered | Multiply by All: local technologies × Providers × Bands. Locations will be determined by applying a 10 wide × 10 long grid across coverage area and selecting test points within each grid sector |

TABLE 1-continued

Example of High Level Tests and Verification

| Step | Capability | Key Performance Metrics | Success Criteria | Determination Methodology | Notes: |
|------|------------|-------------------------|------------------|---------------------------|--------|
| 17 | Access management | System facilitates delivery of SMS Service from authorized cellular phone and reports event | 95% | System running, SMS message sent from powered authorized cellular phone in covered area, verify SMS delivered | Multiply by All: local technologies × Providers × Bands. Locations will be determined by applying a 10 wide × 10 long grid across coverage area and selecting test points within each grid sector |
| 18 | Access management | System does not interfere with commercial cellular service outside the property boundary of the facility | 95% | System running, verify OEM service outside of property boundary | Multiply by All: local technologies × Providers × Bands. Locations will be determined by applying a 10 wide × 10 long grid across coverage area and selecting test points within each grid sector |

Once the physical site survey is accomplished as explained above, engineers can determine site specific data such as power and cooling requirements for equipment, any cable routing access, any access and power requirements, and any antenna locations and similar details. Engineers may determine specifics relating to local or state building codes and issues relating to site (customer) specific permitting. Existing underground utilities may be identified and any other cables tested prior to being energized, including existing and new voltage, fiber optic or Ethernet cables.

As noted before, the managed access system 10 monitors and generates reports for system performance and threat assessments such as alert logs, audit trails, and long-term activity records. These reports can be standardized. Possible reports could include a blocked call detail record that identifies all blocked cellular wireless calls and includes information about the facility from which the call was placed, its date and time, the originator's phone number, the originator's cellular device hardware identifier (ID), and the destination phone number as the dialed digits.

A user ID report may reflect the activity of user ID accounts created and activated during a specific reporting period. This report may indicate the name and user ID of a user that created or activated the account with the date and time stamp and the user accounts that were created or activated and the date the profile was deactivated as well as the last successful or attempted log-in. Information regarding the creation, modification and deletion of a user account may be generated. An audit log report may provide the user ID, name, log-in date and time, activities with the files accessed for each session, and the records and reports for the user ID, name, time and date of failed attempts.

An authorized number alert report may be generated to notify an appropriate operator when a new mobile wireless device 42 has been added or mobile wireless devices deleted from the authorized device list. Authorized number reports may detail the telephone numbers that have been identified as authorized to make calls within the facility 44. This report may include the unique identifier of a user that entered or modified the authorized number status and the dates of status changes to each number. Expiration reports may be provided for authorized cellular wireless device or groups of devices due to expire within 30 calendar days as a non-limiting example.

Figure 28:
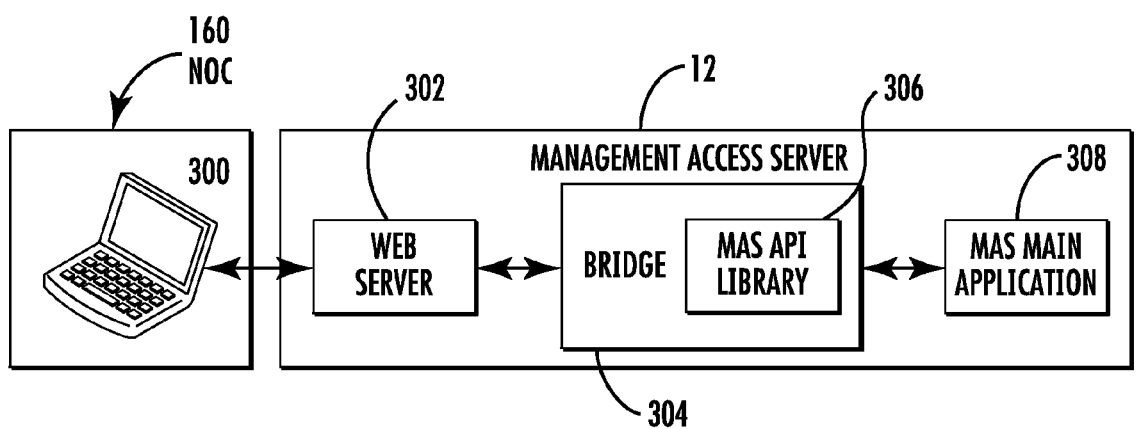
FIG. 28 is a block diagram of Computer Software Configuration Items (CSCI) in accordance with a non-limiting example.

Software CSCI (Computer Software Configuration Items) are now described with reference to FIGS. 28-33. For example, the managed access server 12 may operate with an operator interface 300 such as at the NOC 160 as shown in FIG. 28. A web server 302 interacts between the operator 300 and a bridge 304, including an Applications Programming Interface (API) library 306 and a managed access server main application 308, which may be responsible for command/control of the system 10 and manage the access to a voice/data network and a state of health (SOH) for system hardware. It may authorize devices and access restrictions and generate reports of various activities and include database interactions.

Figure 29:
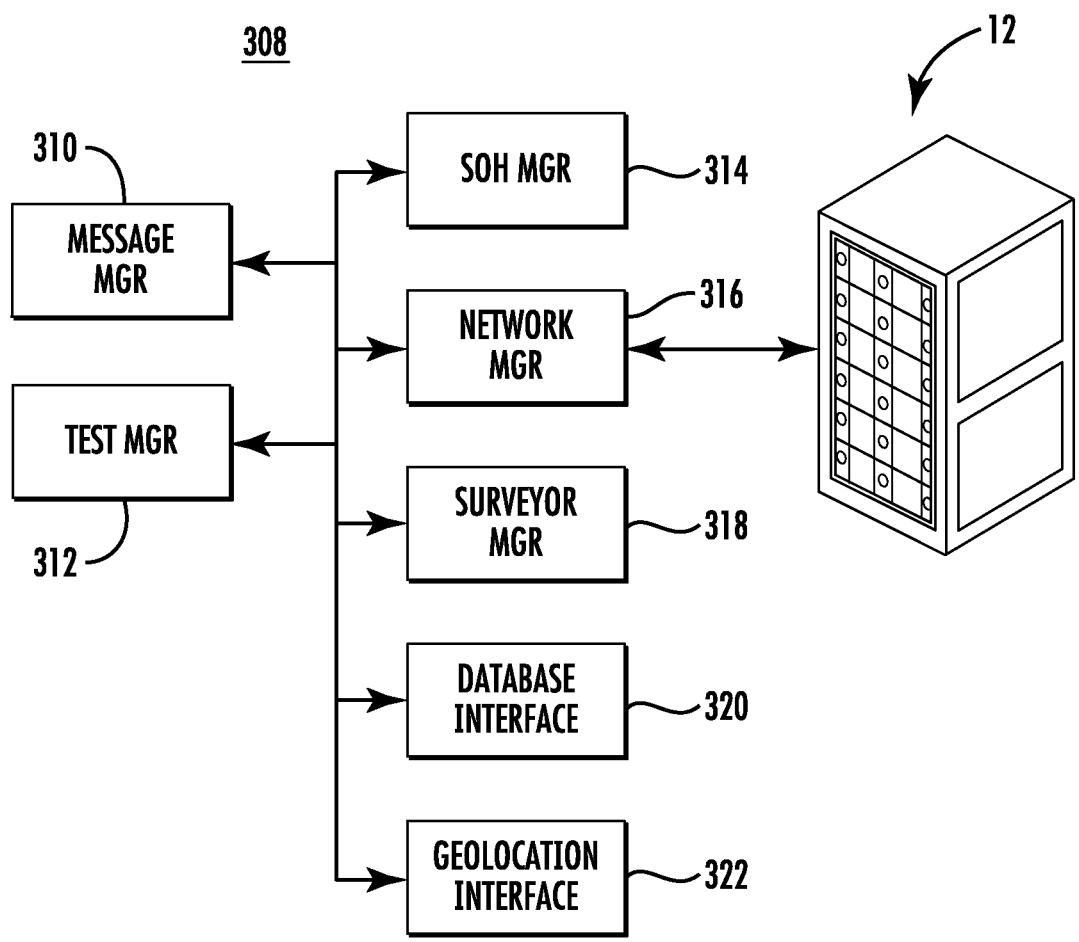
FIG. 29 is a block diagram showing managers and interfaces for the CSCI in accordance with a non-limiting example.
Figure 30:
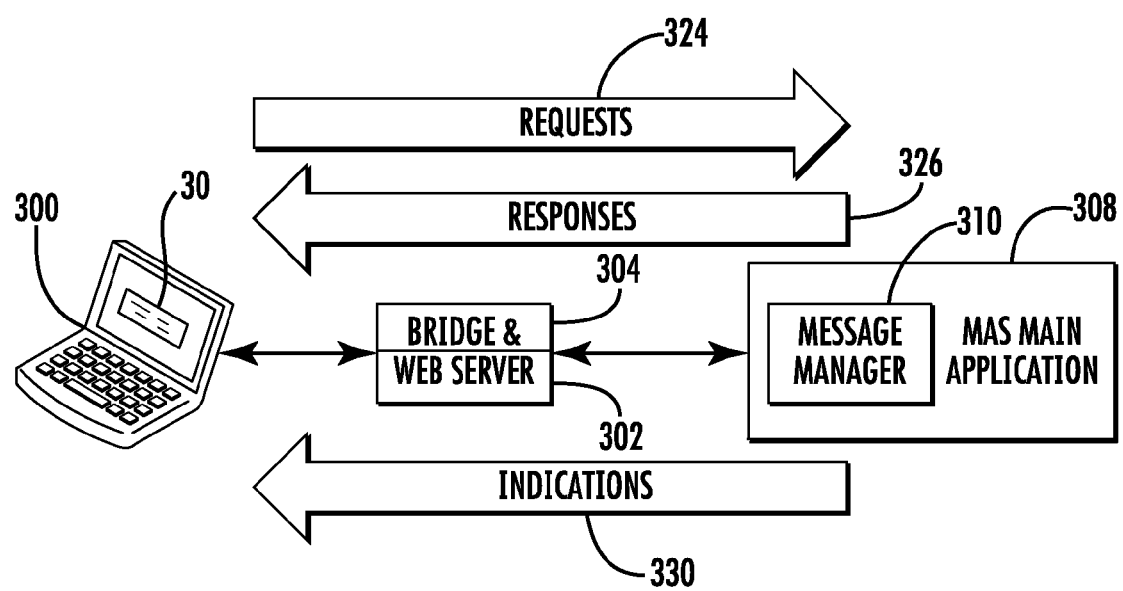
FIG. 30 is a block diagram showing interoperation of the message manager with the components in the CSCI in accordance with a non-limiting example.

The MAS main application CSCI 308 is shown in FIG. 29 and includes functional components of the message manager 310, test manager 312, SOH manager 314, network manager 316 and surveyor manager 318 with interfaces to the database interface 320 and a geolocation interface 322. An example function of the message manager 310 of FIG. 29 is shown in detail in FIG. 30 and operates with the bridge 304 and web server 302 with requests 324 to the main application 308 from the operator 300 and responses 326 back and forward indications 320 to the operator. The message manager 310 handles buffering of incoming messages and dispatches the incoming requests 324. Different supported message types include requests that are input from the graphical user interface 30 and a response 326 as a reply to a received request message. The indication is an unsolicited message sent by the main application.

The network manager 316 shown in FIG. 29 will maintain control and status for all hardware, including SNMP and the API from the manufacturer. It may include a database that maintains site-specific hardware configurations such as the IP address, hardware type, manufacturer and other details.

Figure 31:
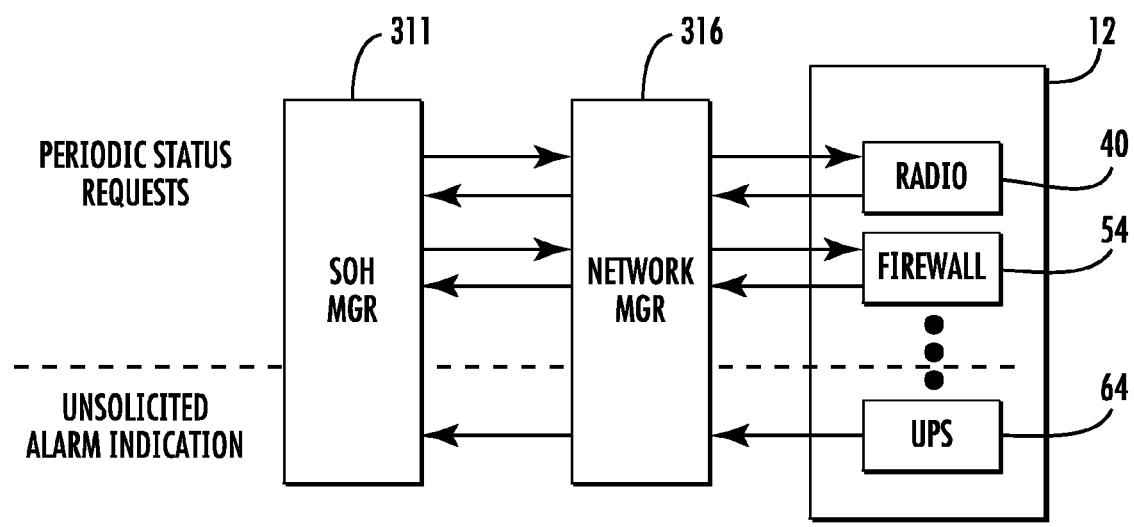
FIG. 31 is a block diagram showing components of the SOH and network manager in accordance with a non-limiting example.

FIG. 31 illustrates the SOH manager 311 that interoperates with the network manager 316 and the server 12 with the various radio circuits 40, firewalls 54 and UPS 64. This manager 311 requests periodic statements of health (SOH) and identifies alarm conditions such as an unsolicited alarm received from hardware and may be based on limits defined in the database with the alarm severity configurable for a facility. For example, some minor problems may be detected but should not generate an alarm in an unsecured facility while a more secured facility such as a correctional facility may be configured to generate alarms more periodically for less critical events. The SOH manager also manages reporting and clearing of active alarms.

The surveyor manager 318 will initiate periodic surveys of surrounding cellular towers and the survey results are stored in the local coverage database 26 (FIG. 1). Alarms are sent to the users when a new tower is detected, a new channel is detected, or a channel power has changed. A database may include system settings, hardware configuration, alarms, listing of authorized devices, detected RF events and authorized users as the system operator.

Figure 32:
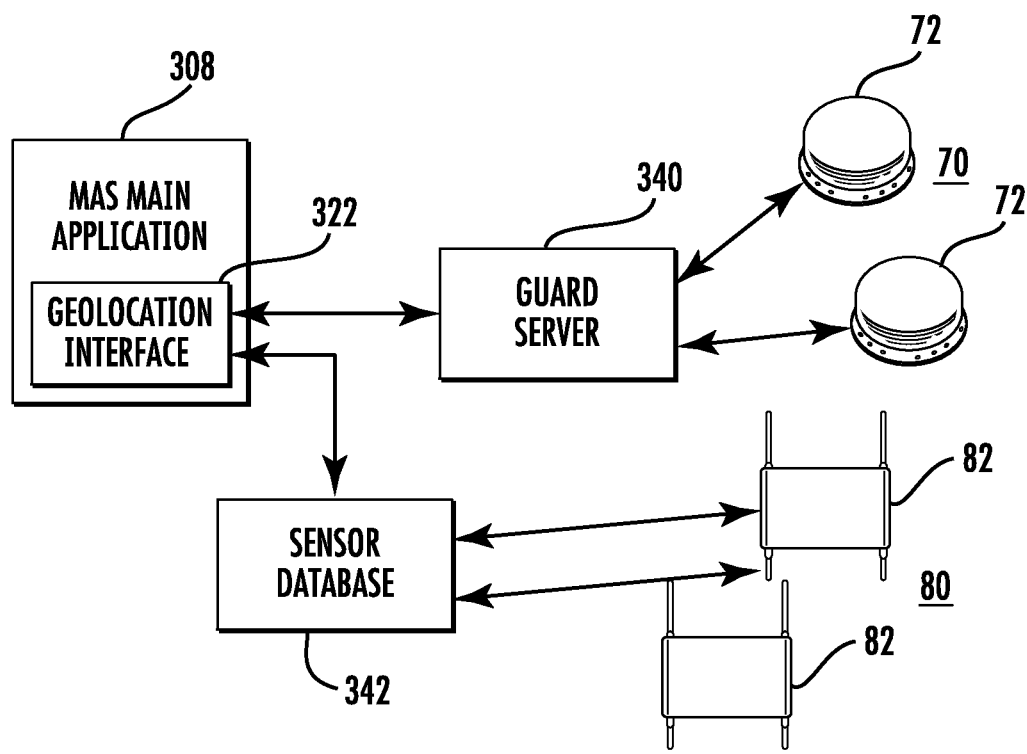
FIG. 32 is a block diagram showing the geolocation interface and interoperation among the internal and external geolocation devices in accordance with a non-limiting example.

Referring now to FIG. 32, the geolocation interface 322 interoperates with a guard server 340 and sends event messages when an RF signal is detected as with the external geolocation sensors 72 forming the external geolocation sensor array 70 and also operates with the internal geolocation sensors 82 forming the internal location sensor array 80 to obtain device location information. The internal sensor array 80 may have its own sensor database 342. The test manager 312 in FIG. 29 may provide interactive menu-driven test capabilities for testing the system.

Figure 33:
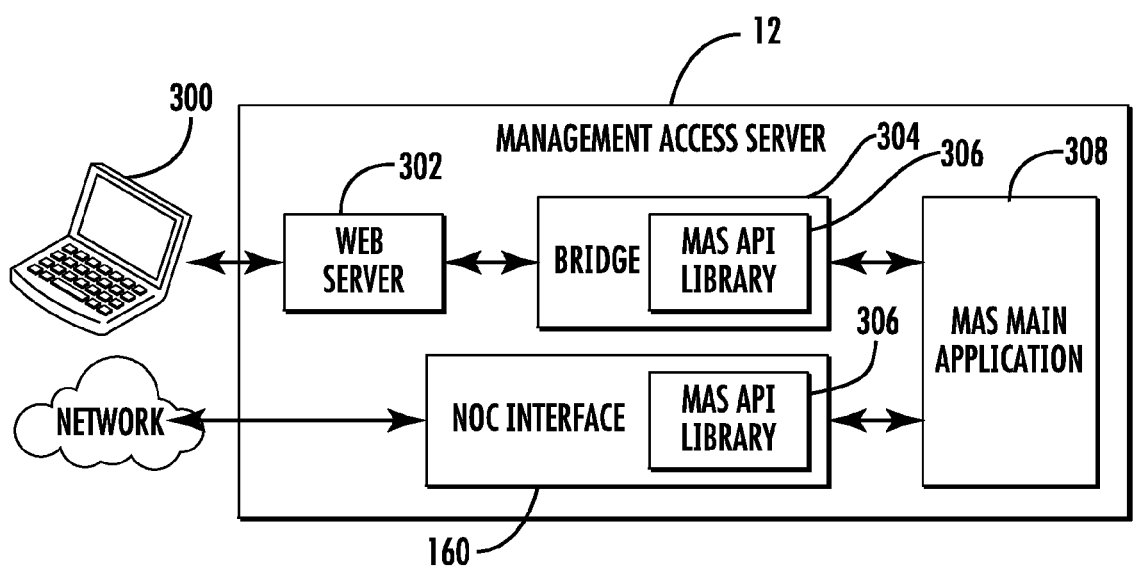
FIG. 33 is a block diagram showing the Application Programming Interface (API) library and the management access controller in accordance with a non-limiting example.

The web server 302 serves the web application and supports multiple simultaneous operators. As shown in FIG. 33, the communications bridge 304 between the web server 302 and the MAS main application 308 will maintain a list of connected users and provides for Remote Procedure Calls (RPC) for the web server and may use the MAS Applications Programming Interface (API) libraries 306 as part of the managed access system 10 and be incorporated into the NOC interface 160 with network connections. Third party applications may include the My SQL database for storing events and settings and Quortus may provide core functionality for the cellular network and interface with radio hardware. A star solutions PDSN may provide data communications for CDMA radios and evaluate PDSM software options. GSOAP generates SOAP services for communicating with Quortus. Open source hardware may include node.js as a web server application and SNMP++ as the API for excessive hardware control and status information. Qt may be the framework used for a bridge application and Protobuf as a messaging library. Boost may provide general utilities and websocket PP may be the websocket API for interfacing with CRFS geolocation software as described above. Rapid JSON may be used as a parser for geolocation data and asterisk may provide a path for voice communications to an SIP trunk. The network operations center can be a remote facility.

This application is related to copending patent applications entitled, "MANAGED ACCESS SYSTEM WITH MOBILE WIRELESS DEVICE GEOLOCATION CAPABILITY," assigned U.S. patent application Ser. No. 14/865,277 and "MANAGED ACCESS SYSTEM WITH MONITORING DEVICE TO DETERMINE AND CHANGE RADIO EQUIPMENT," assigned U.S. patent application Ser. No. 14/865,308 and "MANAGED ACCESS SYSTEM THAT DETERMINES AUTHORIZED AND UNAUTHORIZED MOBILE WIRELESS DEVICES," assigned U.S. patent application Ser. No. 14/865,400 and "MANAGED ACCESS SYSTEM HAVING FILTERED COMMUNICATIONS USING NETWORK INTERFACE DEVICE," assigned U.S. patent application Ser. No. 14/865,466, each which was filed on the same date and by the same Assignee, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A managed access system for mobile wireless devices (MWDs) in a facility, the facility being geographically within a wireless communications network, the managed access system comprising:
   a plurality of antennas arranged at the facility;
   radio equipment coupled to said plurality of antennas;
   at least one MWD monitoring device for the wireless communications network; and
   a management access controller cooperating with said radio equipment to communicate with a given MWD within the facility, block outside communications via the wireless communications network when the given MWD is an unauthorized MWD, and provide outside communications when the given MWD is an authorized MWD;
   said management access controller cooperating with said at least one MWD monitoring device to determine whether the radio equipment and at least one MWD monitoring device both detect the given MWD and generate an indication that the given MWD is outside the facility when said at least one MWD monitoring device detects the given MWD but said radio equipment does not detect the given MWD.

2. The managed access system according to claim 1 wherein each of the plurality of antennas comprises a directional antenna.

3. The managed access system according to claim 1 wherein the plurality of antennas are arranged around a periphery of the facility.

4. The managed access system of claim 1 wherein the at least one MWD monitoring device is operable for both cellular and non-cellular communications.

5. The managed access system of claim 1 wherein the at least one MWD monitoring device comprises a plurality of external monitoring devices arranged around a periphery of the facility.

6. The managed access system of claim 5 wherein the plurality of external monitoring devices operates based on time-difference-of-arrival signals.

7. The managed access system of claim 1 wherein the at least one MWD monitoring device comprises a plurality of internal monitoring devices arranged within a periphery of the facility.

8. The managed access system of claim 7 wherein the facility comprises a building; and wherein at least some of the plurality of internal monitoring devices are located within the building.

9. The managed access system of claim 1 wherein said radio equipment comprises a plurality of picocell radios, each coupled to a respective antenna; and wherein said management access controller implements a corresponding change in said radio equipment in response to a change in the wireless communications network.

10. The managed access system of claim 9 wherein said management access controller implements the corresponding change in said radio equipment as at least one of change in a power level of at least one of said picocell radios, a change in a communications protocol of at least one of said picocell radios, and a change in a frequency range of at least one of said picocell radios.

11. The managed access system of claim 1 wherein said management access controller provides outside communications when the given MWD is an authorized MWD via another network other than the wireless communications network.

12. The managed access system of claim 1 wherein said management access controller provides outside communications when the given MWD is an authorized MWD via at least one of the Public Switched Telephone Network (PSTN), and an Internet Protocol (IP) network.

13. The managed access system of claim 1 wherein said radio equipment is operable according to at least one of an LTE, CDMA, UMTS and GSM protocol.

14. A management access controller for a managed access system for mobile wireless devices (MWDs) in a facility, the facility being geographically within a wireless communications network, the managed access system comprising a plurality of antennas arranged at the facility, radio equipment coupled to the plurality of antennas, and at least one MWD monitoring device for the wireless communications network, the management access controller comprising:
a processor and a memory coupled thereto to
cooperate with said radio equipment to communicate with a given MWD within the facility, block outside communications via the wireless communications network when the given MWD is an unauthorized MWD, and provide outside communications when the given MWD is an authorized MWD, and
cooperate with said at least one MWD monitoring device to determine whether the radio equipment and at least one MWD monitoring device both detect the given MWD and generate an indication that the given MWD is outside the facility when the at least one MWD monitoring device detects the given MWD but the radio equipment does not detect the given MWD.

15. The management access controller according to claim 14 wherein each of the plurality of antennas comprises a directional antenna.

16. The management access controller according to claim 14 wherein the plurality of antennas are arranged around a periphery of the facility.

17. The management access controller of claim 14 wherein said processor and memory cooperate with the at least one monitoring device to provide for both cellular and non-cellular communications.

18. The management access controller of claim 14 wherein the at least one MWD monitoring device comprises a plurality of external monitoring devices arranged around a periphery of the facility; and wherein said processor and memory cooperate with the external monitoring devices to determine whether the radio equipment and at least one MWD monitoring device both detect the given MWD.

19. The management access controller of claim 18 wherein said processor and memory cooperate with the plurality of external monitoring devices to operate based on time-difference-of-arrival signals.

20. The management access controller of claim 14 wherein the at least one MWD monitoring device comprises a plurality of internal monitoring devices arranged within a periphery of the facility.

21. The management access controller of claim 14 wherein the radio equipment comprises a plurality of picocell radios, each coupled to a respective antenna; and wherein said processor and memory implement a corresponding change in the radio equipment in response to a change in the wireless communications network as at least one of change in a power level of at least one of the picocell radios, a change in a communications protocol of at least one of the picocell radios, and a change in a frequency range of at least one of the picocell radios.

22. The management access controller of claim 14 wherein said processor and memory implement outside communications when the given MWD is an authorized MWD via another network other than the wireless communications network.

23. The management access controller of claim 14 wherein said processor and memory implement outside communications when the given MWD is an authorized MWD via at least one of the Public Switched Telephone Network (PSTN), and an Internet Protocol (IP) network.

24. The management access controller of claim 14 wherein the radio equipment is operable according to at least one of an LTE, CDMA, UMTS and GSM protocol.

25. A method for operating a managed access system for mobile wireless devices (MWDs) in a facility, the facility being geographically within a wireless communications network, the managed access system comprising a plurality of antennas arranged at the facility, radio equipment coupled to the plurality of antennas, and at least one MWD monitoring device for the wireless communications network, the method comprising:
operating a management access controller to
cooperate with the radio equipment to communicate with a given MWD within the facility, block outside communications via the wireless communications network when the given MWD is an unauthorized MWD, and provide outside communications when the given MWD is an authorized MWD,
cooperate with the at least one MWD monitoring device to determine whether the radio equipment and at least one MWD monitoring device both detect the given MWD, and
generate an indication that the given MWD is outside the facility when the at least one MWD monitoring device detects the given MWD but the radio equipment does not detect the given MWD.

26. The method of claim 25 wherein the plurality of antennas comprises a plurality of directional antennas arranged around a periphery of the facility.

27. The method of claim 25 wherein the management access controller comprises a processor and a memory coupled thereto.

28. The method of claim 25 further comprising operating the management access controller to operate the at least one MWD monitoring device for both cellular and non-cellular communications.

29. The method of claim 25 wherein the at least one MWD monitoring device comprises a plurality of external monitoring devices arranged around a periphery of the facility; and further comprising operating the management access controller to cooperate with the plurality of external monitoring devices.

30. The method of claim 29 further comprising operating the plurality of external monitoring devices based on time-difference-of-arrival signals.

31. The method of claim 25 wherein the at least one MWD monitoring device comprises a plurality of internal monitoring devices arranged within a periphery of the facility; and further comprising operating the management access controller to cooperate with the plurality of internal monitoring devices to determine whether the radio equipment and at least one MWD device both detect the given MWD.

32. The method of claim 31 wherein the facility comprises a building; and wherein at least some of the plurality of internal monitoring devices are located within the building.

33. The method of claim 25 wherein the radio equipment comprises a plurality of picocell radios, each coupled to a respective antenna; and further comprising operating the management access controller to implement a corresponding change in the radio equipment in response to a change in the wireless communications network.

34. The method of claim 25 further comprising operating the management access controller to provide outside communications when the given MWD is an authorized MWD via another network other than the monitoring wireless communications network.

* * * * *